United States Patent
Borenstein et al.

(10) Patent No.: US 9,918,319 B2
(45) Date of Patent: Mar. 13, 2018

(54) SYSTEM AND PROCESS FOR LOCATION-BASED INFORMATION RETRIEVAL

(71) Applicant: Vioozer Inc., SanDiego, CA (US)

(72) Inventors: Uri Borenstein, Tel Aviv (IL); David Eli Hammel, San Diego, CA (US)

(73) Assignee: VIOOZER, INC., Los Gatos, CA (US)

( * ) Notice: Subject to any disclaimer, the term of this patent is extended or adjusted under 35 U.S.C. 154(b) by 98 days.

(21) Appl. No.: 14/727,855

(22) Filed: Jun. 1, 2015

(65) Prior Publication Data

US 2016/0029368 A1 Jan. 28, 2016

Related U.S. Application Data

(63) Continuation-in-part of application No. PCT/US2015/033438, filed on May 30, 2015.

(60) Provisional application No. 62/006,040, filed on May 30, 2014.

(51) Int. Cl.
*G06F 15/16* (2006.01)
*H04W 72/04* (2009.01)
*H04W 4/02* (2018.01)
*H04W 72/06* (2009.01)

(52) U.S. Cl.
CPC ........... *H04W 72/048* (2013.01); *H04W 4/02* (2013.01); *H04W 4/021* (2013.01); *H04W 72/06* (2013.01)

(58) Field of Classification Search
CPC ....................................................... H04W 4/02
USPC ................................................. 709/206, 224
See application file for complete search history.

(56) References Cited

U.S. PATENT DOCUMENTS

| 2004/0023666 | A1* | 2/2004 | Moon ................. G06F 17/3087 455/456.1 |
| 2004/0128156 | A1 | 7/2004 | Beringer et al. |
| 2009/0088180 | A1* | 4/2009 | LaMance ................. G01S 5/14 455/456.1 |
| 2010/0010913 | A1 | 1/2010 | Pinckney et al. |
| 2010/0203901 | A1* | 8/2010 | Dinoff ................... H04W 4/022 455/456.3 |

(Continued)

FOREIGN PATENT DOCUMENTS

EP 2386878 A1 11/2011

OTHER PUBLICATIONS

International Search Report and Written Opinion of the International Searching Authority dated Oct. 28, 2015 in reference to co-pending International Application No. PCT/US2015/033630 filed Jun. 1, 2015.

(Continued)

*Primary Examiner* — Hieu Hoang
(74) *Attorney, Agent, or Firm* — Dinsmore & Shohl LLP

(57) ABSTRACT

Systems, devices and methods are provided for solving technical problems related to communicating between two or more unrelated mobile devices based on location without needing contact information for the unrelated mobile computing devices. In various implementations, the service is adapted to use a common user base for a location-based matching process. In some implementations, a rough order of magnitude is maintained for users until the user is identified as a potential responder to a location-based request at which time a location request may be made to a mobile computing device. Further, parallel location based requests, such as surveys, may be performed.

22 Claims, 16 Drawing Sheets

(56) References Cited

U.S. PATENT DOCUMENTS

| | | |
|---|---|---|
| 2011/0106917 A1 | 5/2011 | Park et al. |
| 2011/0116453 A1* | 5/2011 | Huang .................. H04W 48/18 |
| | | 370/329 |
| 2011/0136501 A1* | 6/2011 | Britt, Jr. ................ H04W 64/00 |
| | | 455/456.1 |
| 2011/0202626 A1 | 8/2011 | Caplan et al. |
| 2011/0238763 A1* | 9/2011 | Shin ....................... G06Q 10/10 |
| | | 709/206 |
| 2011/0320119 A1* | 12/2011 | Jerez Morales ....... G01C 21/20 |
| | | 701/516 |
| 2012/0008526 A1* | 1/2012 | Borghei ................. H04W 4/021 |
| | | 370/254 |
| 2012/0278195 A1* | 11/2012 | Joseph .................. G06Q 50/10 |
| | | 705/26.2 |
| 2013/0063309 A1* | 3/2013 | Natucci ................ G01S 5/0252 |
| | | 342/451 |
| 2013/0097246 A1* | 4/2013 | Zifroni .................. G06Q 50/01 |
| | | 709/204 |
| 2013/0115872 A1* | 5/2013 | Huang .................... H04W 4/02 |
| | | 455/3.01 |
| 2013/0346233 A1 | 12/2013 | Caralis et al. |
| 2014/0257747 A1* | 9/2014 | Repenning .............. H04W 4/02 |
| | | 702/150 |
| 2015/0046206 A1* | 2/2015 | Kelley .................. G06Q 30/04 |
| | | 705/7.13 |

OTHER PUBLICATIONS

International Search Report and Written Opinion of the International Searching Authority dated Sep. 29, 2015 in reference to co-pending International Application No. PCT/US2015/033438 filed May 30, 2015.

* cited by examiner

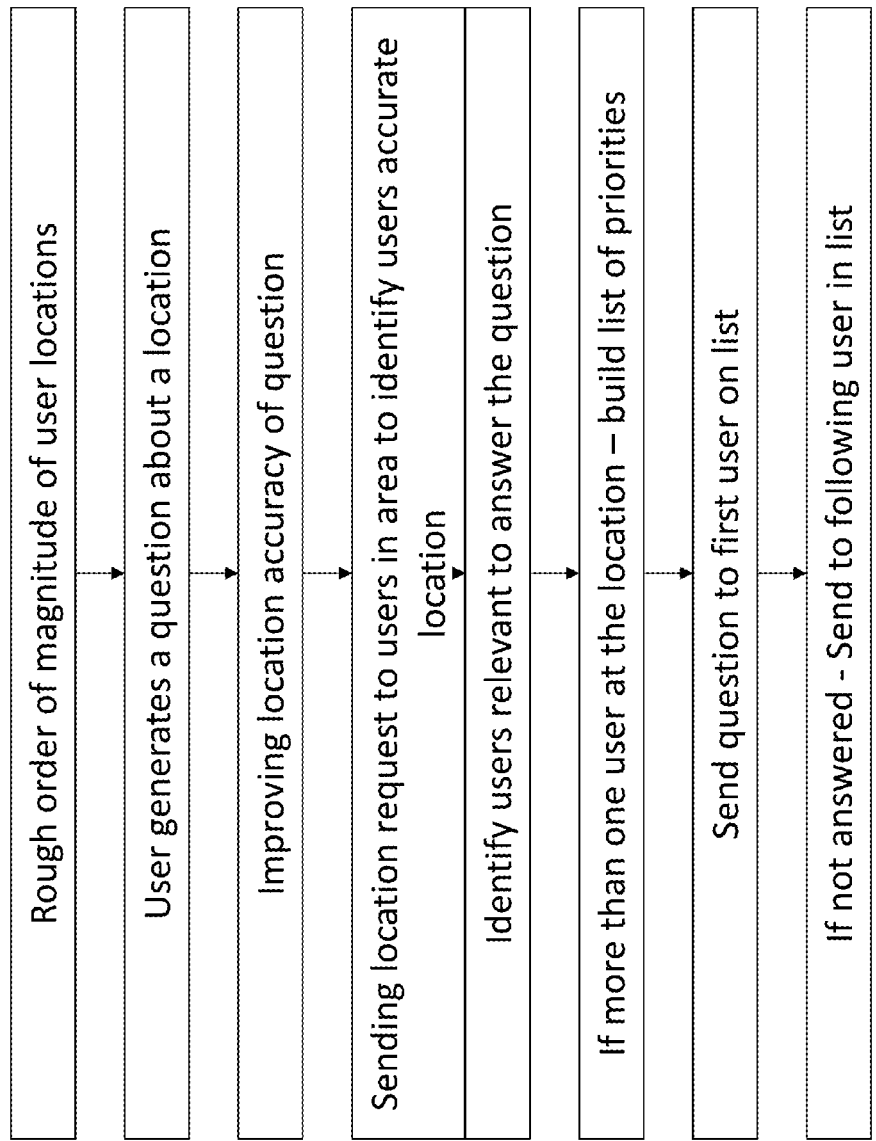
Figure 10 – Matching process

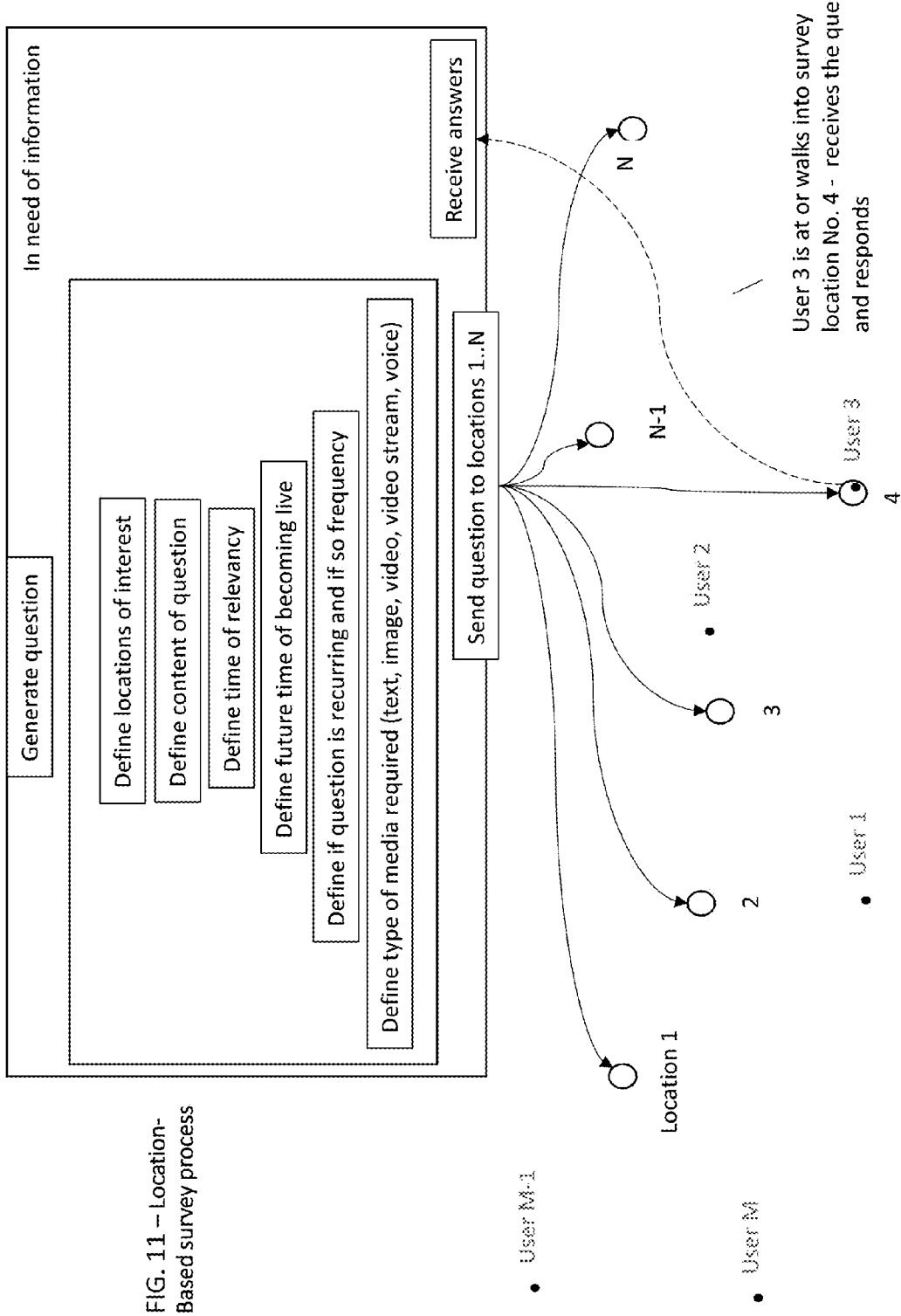
FIG. 11 – Location-Based survey process

SYSTEM AND PROCESS FOR LOCATION-BASED INFORMATION RETRIEVAL

CROSS-REFERENCE TO RELATED APPLICATIONS

This application claims the benefit of U.S. provisional application No. 62/006,040, filed 30 May 2014, which is hereby incorporated by reference as though fully set forth herein. This application is also related to International Application No. PCT/US15/33438 filed May 30, 2015, which also claims the benefit of U.S. provisional application No. 62/006,040, filed 30 May 2014, the PCT/US15/33438 is also hereby incorporated by reference as though fully set forth herein.

BACKGROUND a. Field

The instant invention relates to systems and processes for receiving information requests related to one or more locations and receive responses from one or more other users at the one or more locations.

b. Background

Electronic communications systems exist in which computing devices, such as mobile computing devices, are able to communicate with other computing devices when contact information is known for the other computing device. However, when contact information is not available, typical crowd-sourcing applications transmit information to a broad group of recipients and not to a narrower, targeted subset of computing devices that are determined to be relevant to a particular request.

BRIEF SUMMARY

Systems, devices and methods are provided for solving technical problems related to communicating between two or more unrelated mobile devices based on location without needing contact information for the unrelated mobile computing devices. In various implementations, processes and computing systems are provided that are adapted to communicate with one or more other computing systems based on an association with a particular location. Some implementations, for example, the computing systems are able to generate a request for information associated with a particular location. Processes and systems are provided for identifying one or more other computing devices that are associated with that location (e.g., at the location, within a predetermined distance from the location, within a geofence of the location or the like). Once identified, the processes and systems transmit the request to the one or more other computing devices associated with the location. The receiving computing device may determine whether to respond to the request or not. If no response is received, e.g., within a pre-determined time period, the processes and systems may identify one or more additional computing devices associated with the location (e.g., through a priority list) and transmit the request to one or more additional computing devices associated with the location (e.g., based on the priority list).

In some implementations, a rough order of magnitude of user computing devices may be maintained over time. For example, the locations of mobile computing devices may be received and stored over time to determine the rough order of magnitude of the locations of user computing devices. The locations may be reported by the mobile computing devices when convenient for the user and/or computing devices (e.g., when it would require low energy and/or bandwidth requirements, such as when the user computing devices are connected to a WIFI or other network that might not require much, if any, additional power or costs of transmission.

In some implementations, the processes and systems may make an initial determination of potential responding computing devices based on the rough order of magnitude of user locations stored. The processes and systems may also determine a more precise or accurate location when a user and his or her computing device is determined to be relevant to the location associated with a particular request for information about a location of interest. In this manner only a subset of computing devices are requested to provide a more precise or accurate location and only based on the determination that the computing device might be relevant to the location of interest based on the rough order of magnitude of location stored for the user's computing device (e.g., mobile computing device). Thus, energy and processing intensive location determinations (both for the computing devices and the location-based communications system) need not be performed for each request for information and the processes and systems may determine location information for computing devices likely to be relevant to a particular request for information but not for computing devices that are not likely to be relevant.

In one implementation, a system and process are provided that provides location-based search capabilities. The system/process comprises: receiving a location-based request generated on first computing device; analyzing the request using a processor, wherein the operation of analyzing includes identifying a location associated with the response and determining at least one potential responding computing device associated with the location; and transmitting the request to the at least one potential responding computing device for generation of a response to the location-based request.

In another implementation, a system and process are provided that provide location-based search capabilities. The system/process comprises: receiving a location-based request generated on first computing device; analyzing the request using a processor, wherein the operation of analyzing includes identifying a location associated with the response and determining at least one potential responding computing device associated with the location, wherein the location is determined based upon an analysis of a plurality of location databases; and transmitting the request to the at least one potential responding computing device for generation of a response to the location-based request.

In yet another implementation, a system and process are provided for creating a common ad hoc user base for a location-based system. In this implementation, the system/process comprise: adding a first plurality of users into a common ad hoc user base, the first plurality of users corresponding to a first application or service; and adding a second plurality of users into the common ad hoc user base, the second plurality of users corresponding to a second application or service unrelated to the first application, wherein the common ad hoc user base maintains location information corresponding to at least the first and second plurality of users in real-time, near-real-time and/or relevant-time.

In another implementation, a system and process are provided that provide a sponsored response in a location-based service. In this implementation, the system/process comprise: receiving a location-based request generated on first computing device; analyzing the request using a processor, wherein the operation of analyzing includes identifying a location associated with the response and determining at least one potential responding computing device associated with the location, wherein the location is verified based on at least one prior completed response or is determined based upon an analysis of a plurality of location databases; and transmitting the request to the at least one potential responding computing device for generation of a response to the location-based request, wherein the potential responding computing device is identified based on a sponsorship request related to the request and/or the location.

In yet another implementation, a system and process are provided that provide location-based search capabilities comprising: a server configured to receive a location-based request generated on a first computing device via a communication port, analyze the request using at least one processor to determine a potential responding device and forward the incoming location-based request to a selected potential responding device, wherein the server is configured to execute an algorithm via software on at least one processor of the server, wherein the processor is configured to analyze the request via software executing on the at least one processor to perform the following operations: receiving a location-based request generated on first computing device; analyzing the request using a processor, wherein the operation of analyzing includes identifying a location associated with the response and determining at least one potential responding computing device associated with the location, wherein the location is verified based on at least one prior completed response or is determined based upon an analysis of a plurality of location databases; and transmitting the request to the at least one potential responding computing device for generation of a response to the location-based request.

In another implementation, a system and process provide for matching a user request based upon a location. In this implementation, the system and process comprise: performing a rough order of magnitude of locations associated with user mobile computing devices and storing the rough order of magnitude of locations over time; receiving a request about a location; identifying a first plurality of potential responding mobile computing devices associated with the location by comparing the location to the stored rough order of magnitude of locations; sending a location request to each of the first plurality of potential responding mobile computing devices having a stored rough order of magnitude location associated with the location to identify accurate locations of each of the first plurality of potential responding mobile computing devices; identifying at least one second mobile computing device associated with the location based upon responses from to the location request.

In other implementations, systems and processes are provided that allow for a requesting information related to one or more locations from a plurality of potential respondents. In one particular implementation for example, a requesting user such as a news or weather organization can send a request to unrelated other users requesting information about news events or weather related to one or more particular locations. The requests may be forwarded to computing devices that are associated with the one or more particular locations that may opt to respond to the request. Thus, in this example, information may be rapidly obtained related to a particular location.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 10 shows another example process of a user matching process of a location-based service for receiving a request related to one or more particular locations and matching that request to one or more potential responders, according to one or more implementations shown and described herein.

FIG. 11 shows an example location based survey process in which a question or request is generated and sent in parallel to a plurality of users in a plurality of locations, according to one or more implementations shown and described herein.

DETAILED DESCRIPTION

Figure 1:
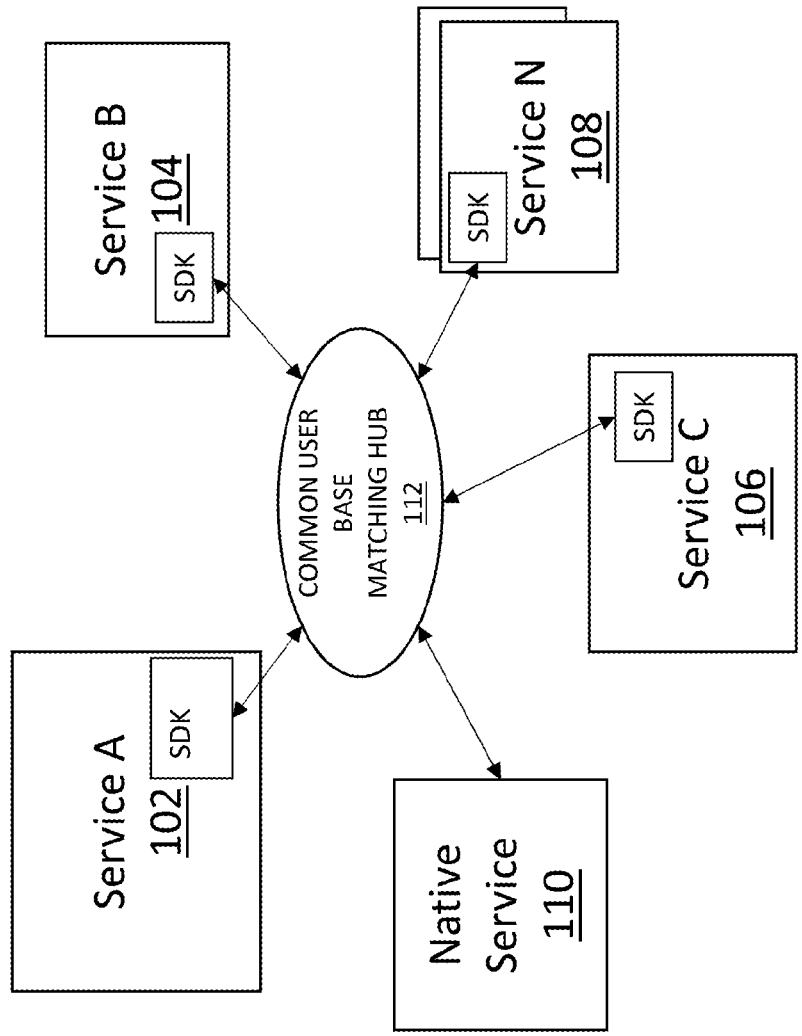
FIG. 1 shows an example implementation of a system for requesting and retrieving location-based information from computing devices of other users associated with a location, according to one or more implementations shown and described herein.

In various implementations, systems and processes are provided for determining information related to one or more locations in response to a request (e.g., a question) for information related to the one or more locations. In one implementation, for example, a user enters a request for information about one or more locations on a requesting device, such as a portable computing device (e.g., a smart-phone, tablet, smart-watch, wearable computing device or the like). The request for information is forwarded, directly or indirectly (e.g., via a server), from the requesting device and received on an answering device, such as another portable computing device. A user of the answering device accesses the request for information and can choose whether to respond to the request or not. If the user opts to respond to the request for information, the answering user responds to the request with an answer to the request for information into the answering device, and the response is returned, directly or indirectly (e.g., via a server) to the requesting device.

In one implementation, for example, the system and process provide responses (e.g., answers) to location-based inquiries in real-time, near-real-time and/or "relevant time" with respect to the inquiries. For purposes of this application, the terms "relevant time" and "near-real-time refer to the earliest an information is available and provided. Further, the systems and processes described in various implementations can leverage the power of crowd-sourcing to provide responses to location-based inquiries from users that are presently or recently were in one or more locations relevant to a particular inquiry.

The system and processes may further provide a common user location platform in which a single or aggregated cloud-based database (e.g., located on one or more servers) or other databases include aggregated and updated user locations of a plurality of service providers and native application users. By having the service providers and application users connected to a common database or set of databases, the system and process, in this implementation, provides a "larger than own" virtual user-base to each one of the participating services, enhancing by several factors service quality to all parties.

Thus, a single platform may aggregate the location of users from several different platforms or services that enable a user from one service to respond to a request from a user of a second service. The platform may be anonymous or not. Details in the request or response may reveal information about a user useful such as for advertising targeting. The common platform may further provide a system for classifying questions and answers based on attributes, such as origin, time and location.

Privacy information can also be kept in certain implementations according to personal settings of application users due to their willingness to allow personal location information. In some implementations, all responses are provided to a requester anonymously although the system and processes may also allow users to opt out of anonymity (e.g., allow the users to connect via the application and/or through another application (e.g., social media)).

Requests and responses may be private (limited to the requester and responder) or public (available to any user or group of users).

Location information may be determined from personal computing devices of potential respondents in any number of manners. Location information, for example, may be actively offered by potential respondents (e.g., checking in at a location), polled or pulled automatically from the computing devices of potential respondents as they move (e.g., at a predetermined interval or based on a determination that the device(s) have moved locations). In various implementations, users of the devices may set location settings controlling how their personal devices may be accessed for location information.

FIG. 1 shows an example implementation of a system 100 for requesting and retrieving location-based information from computing devices of other users familiar with a location, at the location and/or within a predefined perimeter of the location. In one implementation, for example, a requesting user may enter a request using a mobile or non-mobile computing device from one or more users that receive the request for location-based information using their mobile or non-mobile computing devices. In the implementation of FIG. 1, for example, the system includes a plurality of distinct (e.g., $3^{rd}$ party) services that each contribute to a common-user-base location-based platform. In this particular implementation, for example, the system includes a plurality of distinct services (Service A 102, Service B 104, Service C 106, . . . , Service N 108 and Native Service 110) in which aggregated and updated locations of mobile computing devices and, thus users, are integrated into one or more databases (e.g., a cloud-based database) via a common user base matching hub 112 that is adapted to match a question to an answer provider based, in some implementations, not only on the location and profile of the answer provider but also on the service of the answer provider. The individual mobile computing devices correspond to one or more users from the plurality of distinct services 102, 104, 106, 108, 110. By having the users from different eco-systems connected to a common user base/database, each service can leverage users and mobile computing devices associated with other distinct services. In this implementation, the services 102, 104, 106, 108 each include Software Development Kit (SDK) integration into the service. Other forms of integration such as but not limited to Application Programming Interfaces (APIs), widgets and other forms of integration are also contemplated. As an example, a user from one service may ask a question about a specific location and a user from another service that is matched at that location may answer the requesting user.

In one implementation, a request/question refers to an exchange of information, either one-way or bi-directional, which may be in a format of a question or any other format, such as but not limited to a chat, discussion, request for action, request to perform a task, etc., where one side that takes the initiative to make the connection and does not know to whom/which device that a connection will be performed as the system may connect to a user/device at the location of interest or within a pre-defined perimeter that is either there now, was recently there or will be later within a pre-determined period of time.

In one implementation, the common user location platform provides data query and analysis tools adapted to extract tangible and effective information out of the common, integrated database. The common user location platform also supports data mining on one or more location of interest. For example, historical questions and information requests about a specific location may be retained and accessible to users interested in that location. Thus, users may be able to access prior information (e.g., questions, requests, and responses) related to the location. Further aggregation of latest updates about the location, such as tweets, Facebook, foursquare, Instagram, Google+, etc. may also be accessible.

Further, specialized mobile computing devices optimized for real-time or near real-time location based functionality may be provided to one or more users of the system. Dedicated chip-sets for mobile computing devices, for example, may be optimized for location-based functionality. The specialized mobile computing devices, for example, may provide enhanced location accuracy (e.g., using aggregated sensor output such as GPS, WIFI mapping, altitude, temperature, barometric, noise and other sensors), optimized real-time and near-real time video streaming (e.g., including 2G/3G environments), improved energy management and battery optimization, a dedicated sensor collection for passive or active location data sharing, using information from other applications on board the device to improve accuracy and/or lower energy consumption. By leveraging indoor navigation functionality (e.g., using beacon infrastructure, magnetic indoor navigation, etc.) in addition to outdoor navigation functionality, a widespread, unique database of actual indoor and outdoor inventory locations (e.g., the precise location of one or more products within one or more retail locations in a geographic area), and identification of advertising opportunities can be increased.

In one particular implementation, a sponsored response may be provided where a location based request is directed to a particular business or location (e.g., a local business district). In this manner, the request may be matched to one or more sponsor users for providing response to the location-based request. A sponsor, such as business owner in a particular location, may be provided with a direct and straight forward communication channel between a sponsor computing device and a mobile computing device of a user interested in a location at or near the sponsor location (near referring to a predefined perimeter around the location and predefined may be either by the user or by the system or by any other means and may change and be updated over time). The location-based system provides an ability for the sponsor to responds in real-time or near-real-time to such queries or requests through a dedicated response channel.

A sponsor, for example, may have subscribed, e.g., via a business account through which the sponsor may be assigned an integrated and prioritized predefined device (sponsored computing device) in a matching process in a way that ensures the business owners receive all their business related traffic (question and answers provided by other users at the location).

The sponsored response, for example, may be provided in addition to a standard "unbiased" crowd response such that the sponsor (e.g., business owner) can interact directly with a potential customer by providing relevant information before the user/potential customer makes a decision to act. Further, promotions or coupons may be immediately tailored to a particular user, business condition (e.g., store empty/full) instead of providing a predefined impersonal offer or coupon. In addition to the information, the sponsor user may offer an actual personalized value proposition to a user incentivizing him or her to come in and further use the location-based service, disrupting an existing pre-defined and impersonal coupon/advertising model.

In addition, a user may receive segmented ads attached to an answer. The ads may be served according to a specific user/mobile computing device's parameters (e.g., present location and past questions and performances) and the question/request generated. The system may also incentivize services that do not have direct access to businesses to integrate the system and gain functionality and a business opportunity if the user receiving the ad engages with it (e.g., clicks or otherwise selects it), then the service that the answer provider belongs to will be incentivized (e.g, compensated) as well as the service that provided the relevant ad selected by the user will be incentivized.

Figure 2:
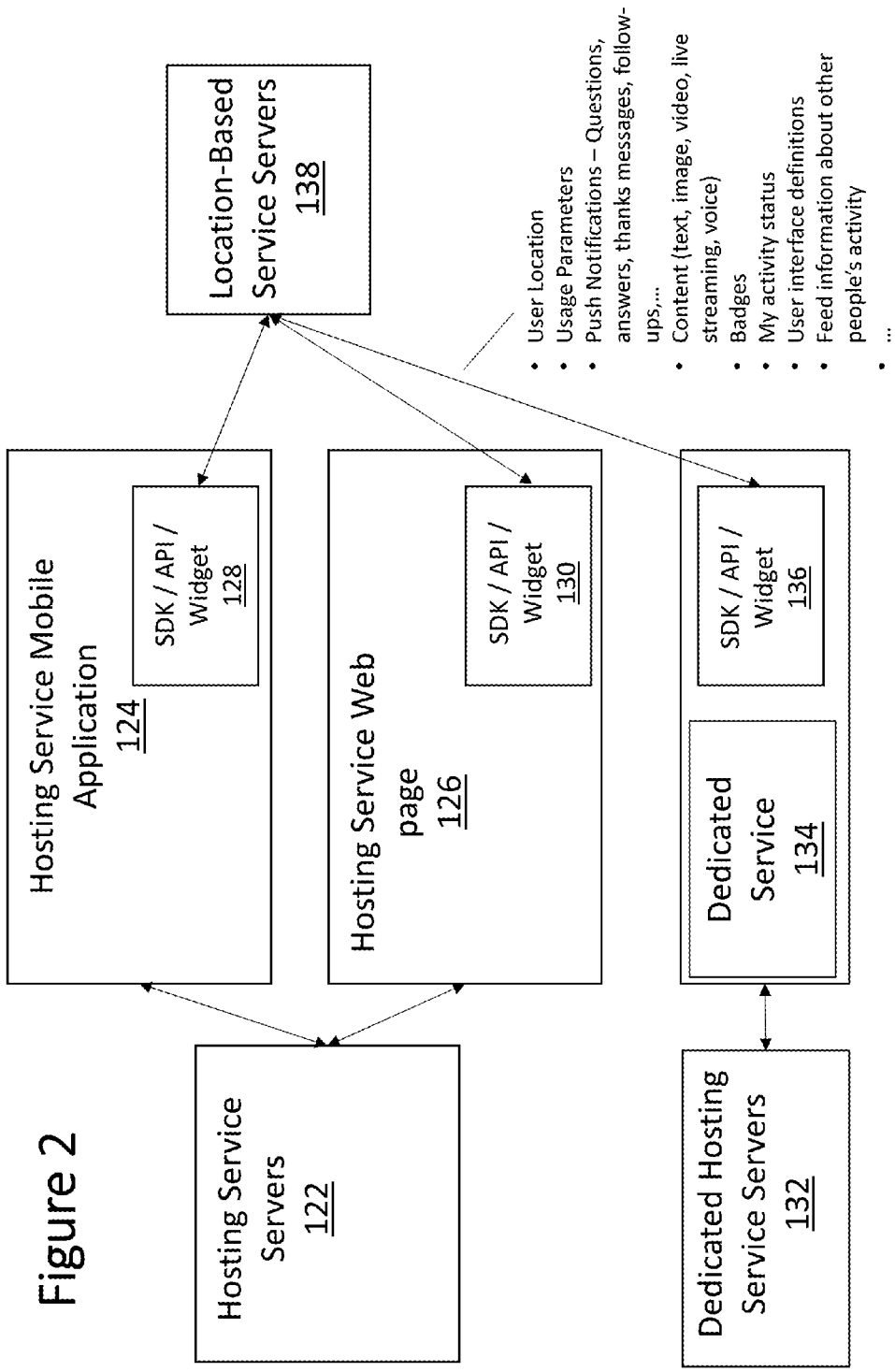
FIG. 2 shows a block diagram of an example integration scheme in which a location-based service is integrated in one or more services, such as the services shown in FIG. 1, according to one or more implementations shown and described herein.

FIG. 2 shows a block diagram of an example integration scheme 120 in which a location-based service is integrated in one or more services 122, such as the services shown in FIG. 1. Each service 102, 104, 106, 108, for example, may include one or more methods of integration, such as via a Mobile Application Hosting Service 124 and/or a Web Page Hosting Service that integrates the location-based service via an SDK, API, widget or other form of integration. Although SDK, API and widget forms of integration are shown, each service can include one or more methods of integration of the location-based service. In the particular implementation shown in FIG. 2, for example, a hosting service includes one or more hosting servers 122 that hosts a Mobile Application Hosting Service 124 and a Web Page Hosting Service 126. Each of the services 124 and 126 include location-based service integration via a SDK/API/widget 128 and 130, respectively. The integration components 128, 130 communicate with Location-Based Service Servers 138, such as to communicate location-based requests and responses as well as other communications. The Location-Based Service Server 138, for example, may provide a common user base matching hub and other services, such as shown in FIG. 1. Communications between the services and the Location-Based Service Servers 138, for example, may include communications such as, but not limited to the following: User Location, Usage Parameters, Push Notifications—Questions, answers, thanks messages, follow-ups, Content (text, image, video, live streaming, voice), Badges, User activity status, User interface definitions, Feed information about other people's activity, and other communications. The term Web, for example, may refer to supporting any type of connected device, such as but not limited to mobile, desktop, tablet, smart TV, wearable device, or the like.

Dedicated/Native location-based services 110 are also shown in FIG. 2. The Dedicated/Native location-based services 110, in this implementation also include one or more hosting servers 132 and one or more dedicated service 134 hosted by the servers 132. In this particular implementation, the dedicated service 134 also communicates with the location-based service servers 138 in a similar manner to Hosting Service Mobile Application 124 and Hosting Service Web Page 126 through an SDK/API/widget or other integration mechanism.

Through integration into existing services, the corresponding user bases of those already existing services can be instantly mutually available as a potential user base that can be leveraged as discussed with reference to FIG. 1. The integrated system can then be used to provide location-based matching from within the existing service. A native application may also be provided to support location based-matching and communication. A native application user base can also be part of the Common-user-base platform.

In this particular implementation, for example, the system and/or process may be at least partially integrated into one or more applications configured to execute on a processor of a computing device, such as a personal computing device. In this example, the system and process may be integrated into existing services (e.g., applications configured to execute onto a smart phone, tablet, wearable computing device or the like) that allow users of these existing services to access the systems and processes for providing and/or stand-alone services providing the location-based services. In this manner, not only users of a particular application/service, but also users of other existing services quickly grow the user base of the system and process to provide a deeper crowd-source pool of users for location-based real-time, near-real time and/or relevant-time search. The systems and processes may further be integrated in other applications/services that provide for a developer to develop other applications on a common platform using the applications/services for location-based real-time, near-real time and/or relevant-time search. The applications, services or other executables configured to operate on a computing device, for example, may include API, App, SDK channels or the like.

Figure 3:
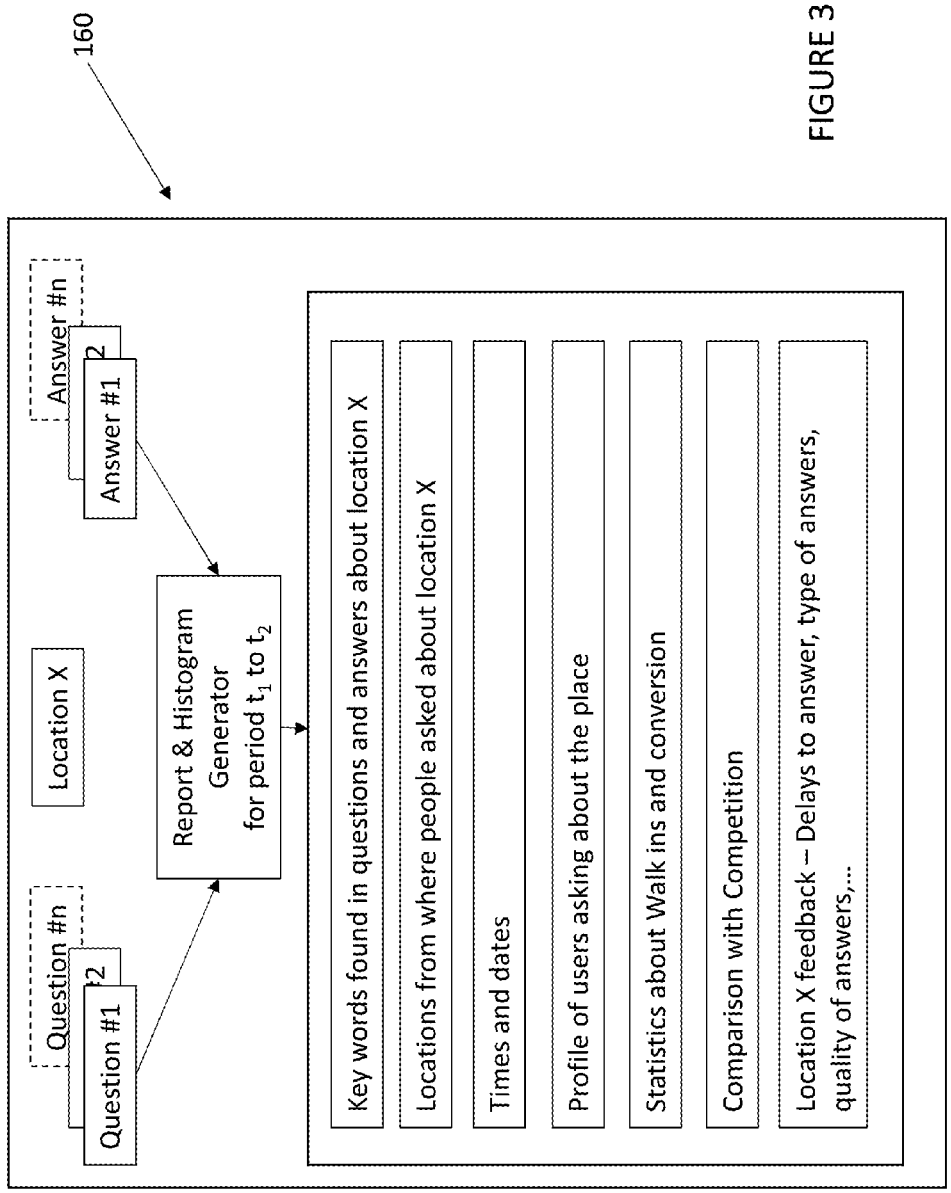
FIG. 3 depicts shows an example implementation of a location report generator, according to one or more implementations shown and described herein.

FIG. 3 shows an example implementation of a location report generator 150. The report generator is able to utilize historical and/or new information and/or real time information as it is being produced data generated, such as but not limited to via location-based requests and responses generated over time with respect to one or more particular locations and generate a report about the specific location, may it be a business, a town, a venue etc., aggregating historical information about that specific location. In this implementation, for example, questions, answers, user information, timing of events and other information may be stored in a database over time and may be used to respond to future requests and/or to develop reports. In one example, a report may be generated by accessing and analyzing data from the historical database between times $t_1$ and $t_2$ for the location X as shown in FIG. 3. In this example, the historical data may be analyzed to determine key words found in questions and answers about the location X, locations from where people asked about the location X, times and dates, profiles of users asking about location X, statistics about walk ins and conversion, comparison with competition of location X, location X feedback (e.g., delay to answer, types of answers, quality of answers, employee activity) as well as other historical data. One or more reports may thus be generated from a wealth of historical data. A business owner may use a report, for example, to find out where the traffic related to the business is generated, what types of concerns have been conveyed or other information to improve operation of the business, such as through targeted advertising or the like. Reports generated by the report generator 160 may take any form. In one particular example, a histogram showing locations of users that requested information about the location on a map may be developed. In another implementation, a report may be used to identify areas of need or of abundance of one or more parameters, such as but not limited to "From where do users ask other users about Pizza?" with respect to a particular location.

Figure 4:
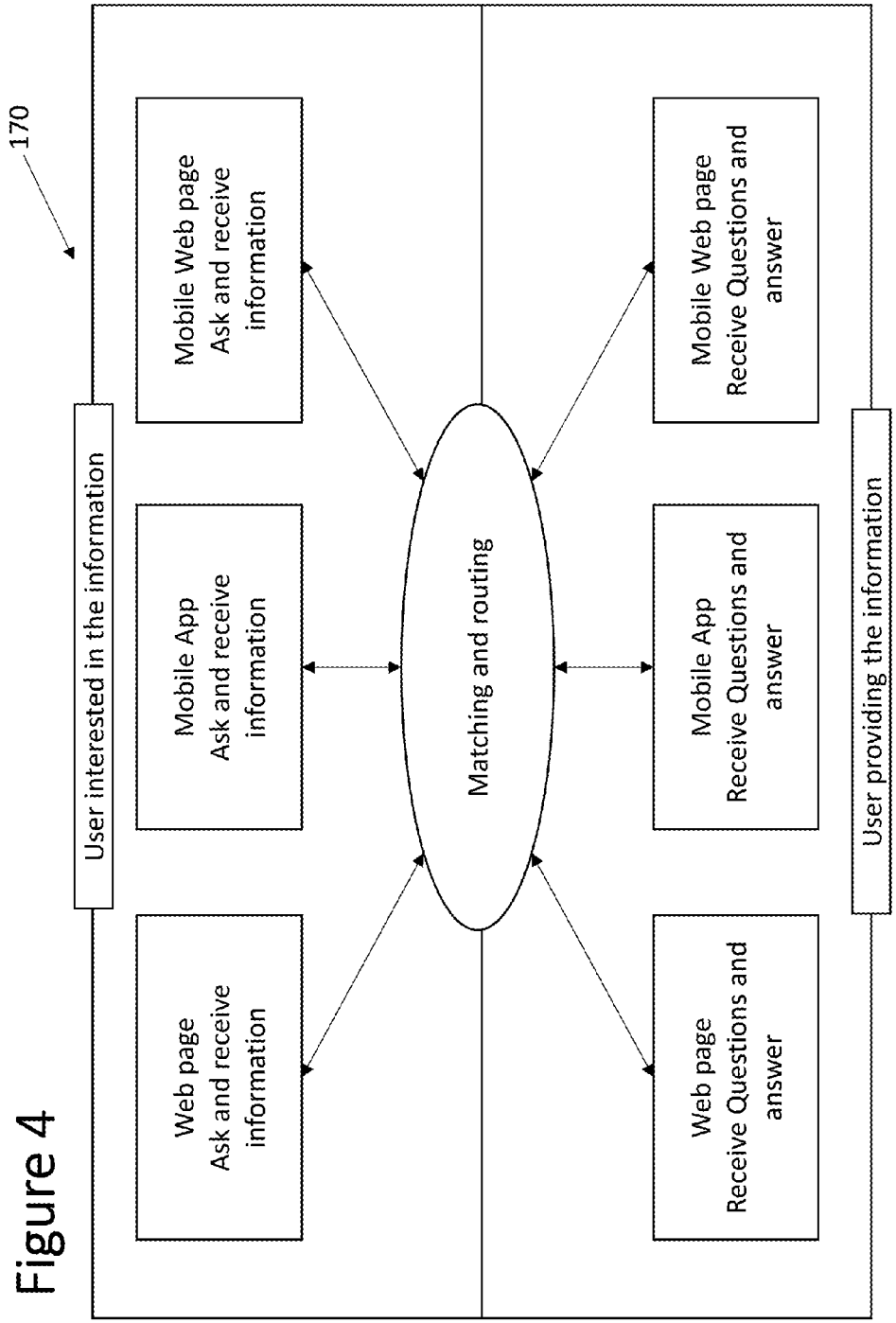
FIG. 4 shows example modes of operation of a system for requesting and retrieving location-based information using a mobile computing device from other mobile computing device users related to a particular location, according to one or more implementations shown and described herein.

FIG. 4 shows example modes of operation of a system for requesting and retrieving location-based information using a mobile computing device from other mobile computing device users related to a particular location. In this implementation, a location-based request may be generated using a computing interface such as a static or mobile web page, application or the like. The system may also include a database and host application that matches location-based requests with one or more mobile computing devices or users near the location or with verified information related to that location (e.g., has answered a threshold number of requests related to that location).

In the particular implementation shown in FIG. 4, a user interested in information about one or more particular locations may use a web page, a mobile application, mobile web page, wearable device and/or smart TV to ask and receive information related to the one or more particular locations. A matching and routing service, discussed in more detail below, matches requests with one or more other users to provide information related to the one or more locations in response. A user may respond, for example, via a web page, mobile application, mobile web page, wearable device and/ or smart TV. The matching and routing service again routes the responses back to the requesting user(s) and insures any additional back and forth communication between the requesting user(s) and responding user(s).

Figure 5:
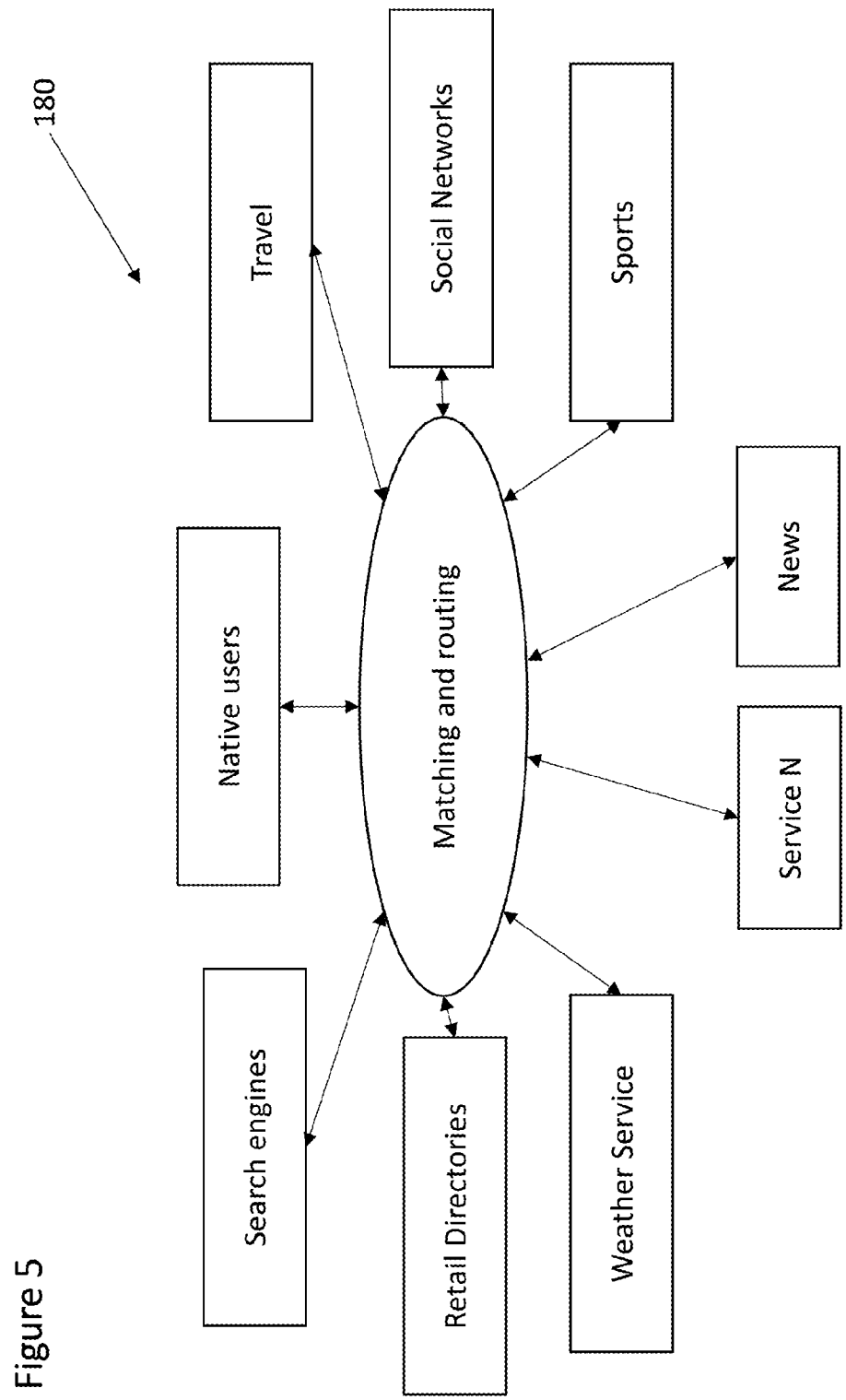
FIG. 5 shows a block diagram of another implementation of a location-based service emphasizing on the common user base platform for matching and routing requests and response related to one or more particular locations, according to one or more implementations shown and described herein.

FIG. 5 shows a block diagram of another implementation of a location-based service emphasizing on the common user base platform for matching and routing requests and response related to one or more particular locations. In this implementation, users from various distinct services may generate requests and responses related to one or more particular locations with questions routed to users of various services (either own service or other services) at the required location(s) (e.g., search engines, retail directories, weather or news services, travel services, social networks, sports services or native users) as described above with reference to FIG. 1. A matching and routing service receives and routes individual location-based requests and responses to other users.

Figure 6:
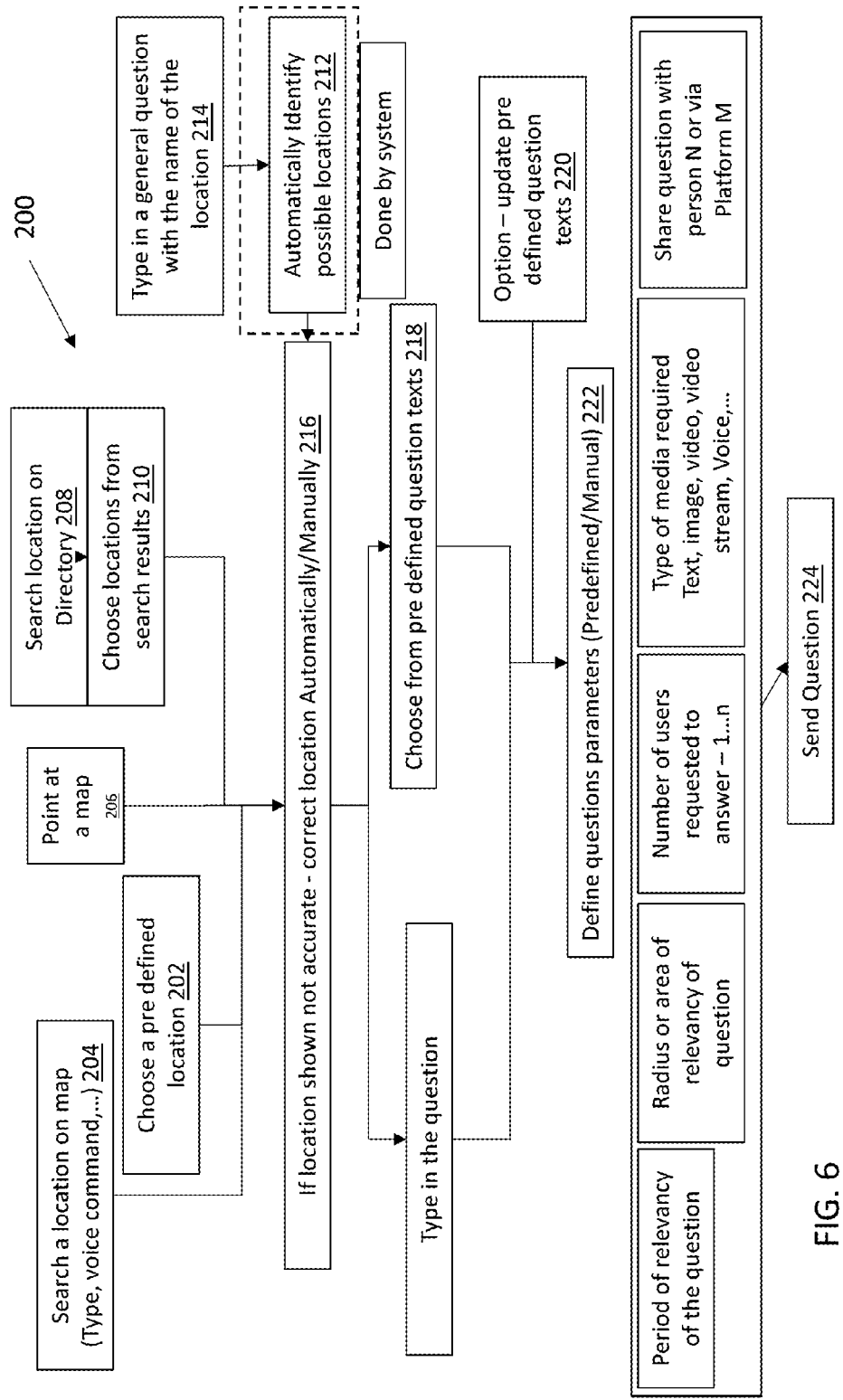
FIG. 6 shows a flowchart of an example process 200 for generating a request for information related to a particular location, according to one or more implementations shown and described herein.

FIG. 6 shows a flowchart of an example process 200 for generating a request for information related to a particular location. In this process, a user may select a location pre-defined from a user interface on a mobile computing device in operation 202. Locations may also be selected from a map or other location representation, such as shown in operation 204 and in operation 206 where a map location may be zoomed into to more precisely identify a particular location of interest. Similarly, a user may search a directory 208 to identify and select an individual or group of locations (e.g., hotels in San Diego), choose their present location 210. Locations may also be defined automatically 212, such as by parsing a request 214 based on proximity or past performance and activity (locations the user tends to frequent). The service may also provide for correction of a location 214 (automatically or manually by the user) if the location generated is not accurate.

A request (e.g., question) is generated, either by a user entering the request in operation 216 (e.g., typing or speaking the request into a mobile communications device) or by selecting a question from one or more predefined requests (e.g., predefined questions) in operation 218. A user may also choose to store the present question for future use or access past questions for present use in operation 220.

One or more request parameters (predefined or manually entered) related to the selected location is defined in operation 222. Request parameters, for example, may include questions, messages, information, defining a period of time for the request to be active/live, radius or area of relevancy, number of users requested, type of media required, anonymous, identified, public, private, or other parameters.

Once a location is selected and request parameters related to the selected location are defined manually, automatically and/or predefined by the service, the mobile computing device sends the request in operation 224 to a centralized service (e.g., hosted on one or more servers such as in the cloud) for analysis and matching to a potential respondent.

The requestor may include an individual generating requests for a particular location or may include a centralized request generator, such as in a news room, that generates one or more requests related to location(s) of interest. The requests, in turn, can be matched with and delivered to one or more potential respondents with information related to the location(s) of interest.

Further, requests may be directed to users connected or associated with a location. For example a request for a taxi may be directed to nearby taxi drivers. Taxi drivers working a particular region, but not already at a taxi stand may be notified of a request for a taxi at a particular taxi stand location.

In one implementation, the request may be directed to mobile computing devices located at or near a particular location associated with the request. The requests may also be routed to mobile computing devices not located near the location, such as where a user has demonstrated knowledge of the location or a sponsor associated with the location in some manner (e.g., owner of a business in the area).

In addition or instead of an answer from a user at the location, a service may provide past information relevant to the location. For example, where a request is received inquiring about the wait time at the Department of Motor Vehicles (DMV), and no users are present, the answer can be answered by another user remotely or the information can be sourced out of available data, e.g., "Usual answer received from this location on Thursday at 11:00 am is: Very long, 55 minute average wait time."

Figure 7:
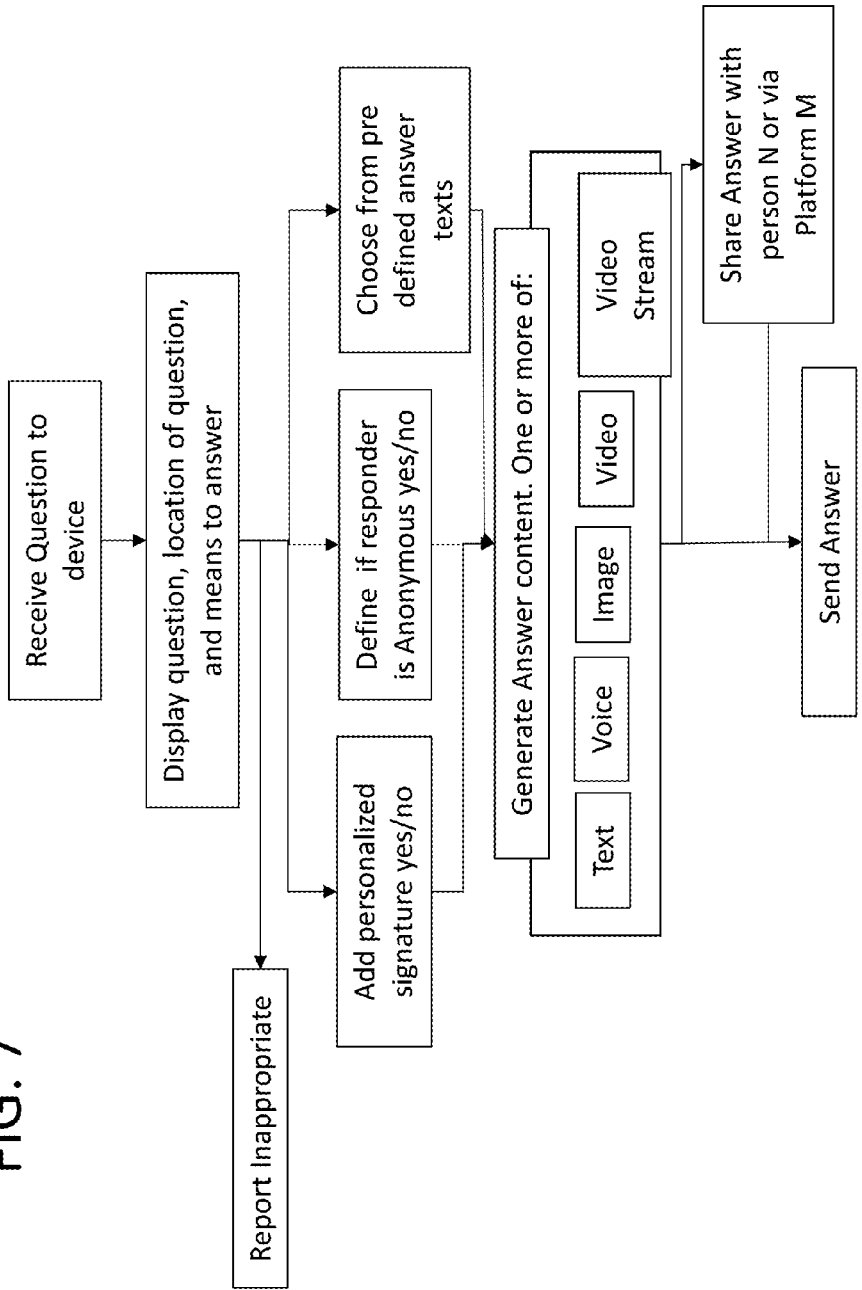
FIG. 7 shows a flowchart of yet another example process for receiving a request and generating a response to the request, according to one or more implementations shown and described herein.

FIG. 7 shows a flowchart of yet another example process 260 for receiving a request and generating a response to the request. A request or response, for example, may be delivered in any format, such as but not limited to a text, email, image, recorded audio and/or video, live video or audio streaming or voice over IP. In this process, a mobile computing device receives a request related to a particular location in operation 262. A notification (e.g., a push notification) is provided on the mobile computing device identifying that a request has been received. The request is displayed on the mobile computing device in operation 264. The request may be reported as inappropriate or otherwise rejected in operation 266. Tools are also provided for generating a response in operations 268, 270, 272 to the request using the mobile computing device. In operation 274, an image, video or audio may be captured for the response. The image, video or audio is approved for transmission and/or edited for transmission (e.g., compressed or filtered). The process may also provide a text interface/editor for adding text to the response as well as identifying response parameters. The response is then sent in operation 276. The response may be directly or indirectly returned to the requesting computing device, such as show in operation 278.

Requests may ask for real-time or near-real-time video or audio streaming from a location. The request, for example, may define a location of interest and content (e.g., child's ball game at local field). The process may coordinate the beginning of a stream, provide the ability to record or save the stream, give directions to the user streaming the video or audio (e.g., zoom in, left, right, up, down, etc.) Directions for example, may be delivered by text or predefined buttons.

Requests may also provide the ability to perform a location based auction (by offering an item for sale or offering to buy an item from multiple possible vendors) or other sale.

Figure 8:
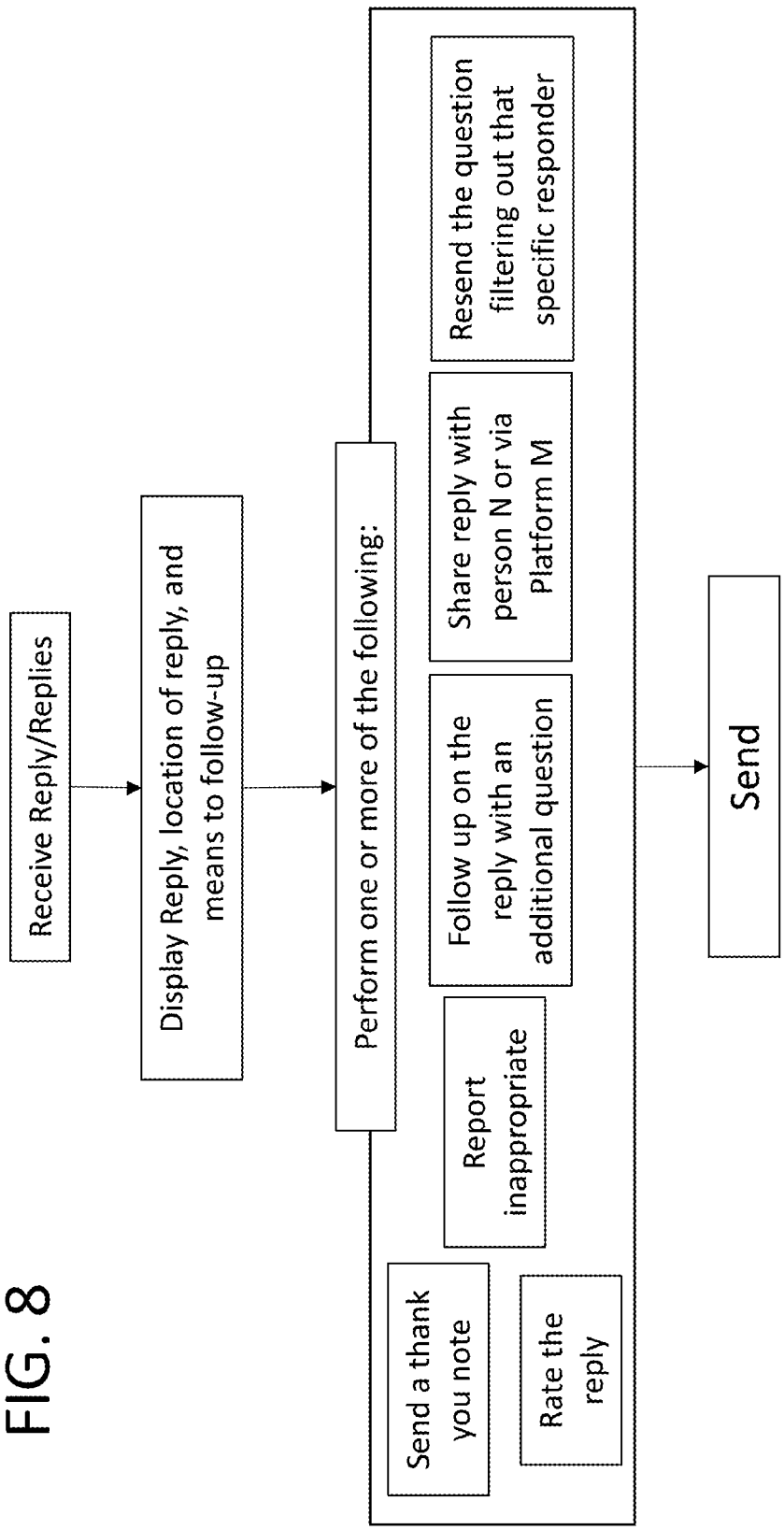
FIG. 8 shows a flowchart of another process for receiving a response, according to one or more implementations shown and described herein.

FIG. 8 shows a flowchart of another process 280 for receiving a response. In operation 282, a notification (e.g., a push notification) is provided on the mobile computing device identifying that a response has been received. The response is displayed on the mobile computing device in operation 284. The user may then be given an option to perform one or more actions in response in operation 286. The user, for example, may rate the response (e.g., 1-5), thank the responder, generate a reward to the responder, follow up on the response with an additional question or other text, initiate a further communication session (e.g., private or public chat, call, video conference or other communications option), invite third parties (e.g., other people at the location) to join a communications session, share the response, or resend the question filtering out the particular responder.

Figure 9:
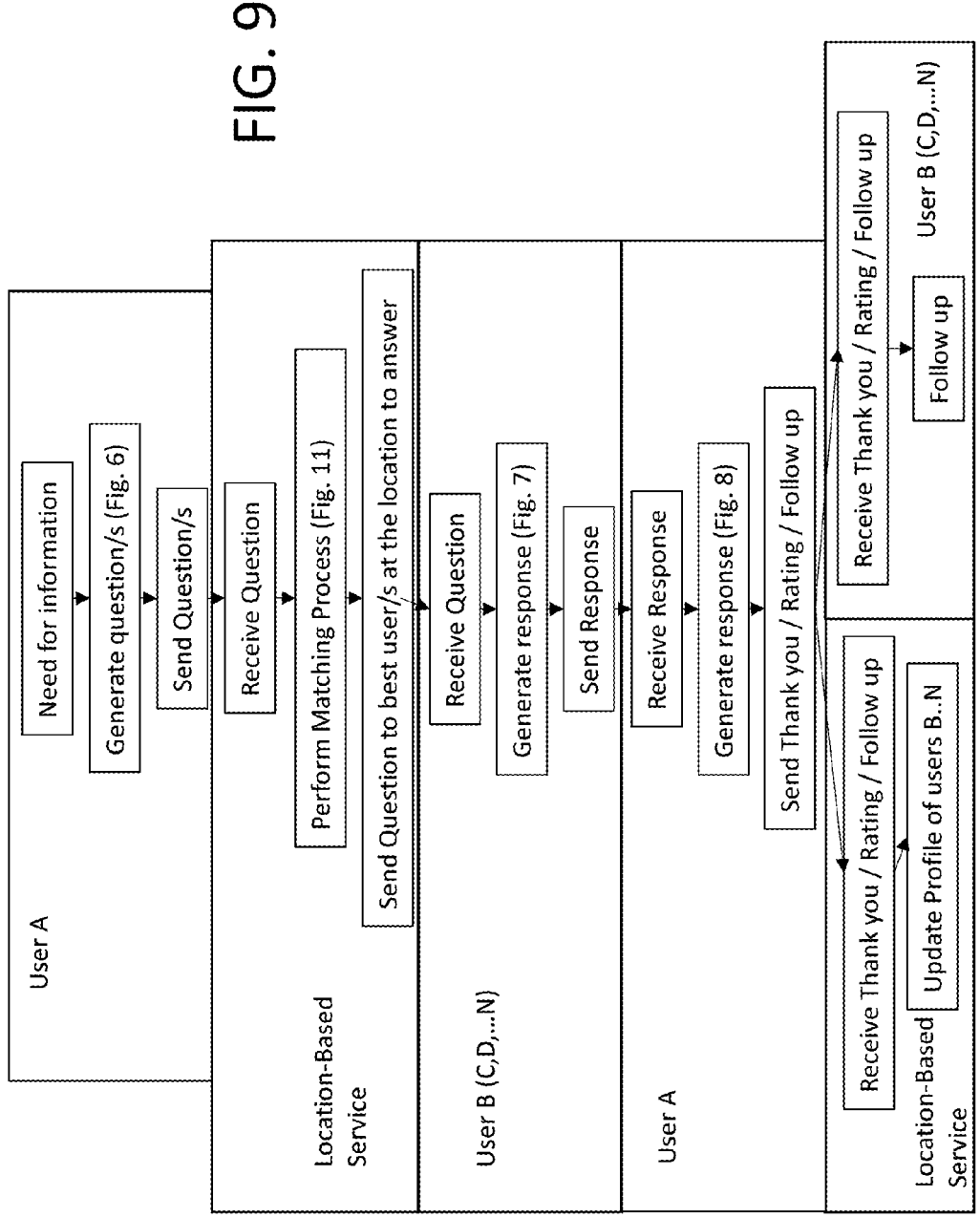
FIG. 9 shows a flowchart of another example process for providing location-based services, according to one or more implementations shown and described herein.

FIG. 9 shows a flowchart of another example process 300 for providing location-based services. In this implementation, a first user identifies a need for information 302 related to one or more particular locations, generates one or more questions related to that information 304 and sends the questions 306 identifying the one or more particular locations. The location-based service receives the question 308, performs a matching service 310 further described with reference to FIG. 10, and forwards the question to one or more users related to or located at the particular location 312. One or more users receive the question 314, generate a response 316 and send the response 318 as described above. The originating user receives the response 320, generates a response 332 and sends a thank you, rating, follow up or further information 334 in response. The location-based service receives the thank you, rating follow up or further information 326 and updates the profiles of the responding user(s) 328. The responding user(s) receive the thank you, rating follow up or further information 330 and follows up 332.

In this implementation, a host application window provides a source for launching a location-based search in a first operation. The search application enables the requesting user to fine-tune a desired location (e.g., on a map) in a second operation. A question is generated as a request in a third operation, and the request is received at a potential responder's computing device in a fourth operation. The responder generates a response in a fifth operation, and the requester receives the response in a sixth operation.

The systems and processes described herein further include a matching process configured for executing on a processor of a computing device (e.g., an algorithm) to match requestors and responders within the systems and processes described herein. In several implementations, the systems and process further provide data query and analysis tools configured to extract tangible and effective information from one or more databases.

An algorithm, for example, in order to provide the best/most accurate response (or relatively improved response), may match a question to one or more users with the right profile(s) at the correct location with the right historical Past performance record as quickly as possible (or at least within a threshold time period). The algorithm may be continuously updated and improved as a function of acquired information (e.g., traffic information), machine learning processes and lessons learned.

In one example implementation, the algorithm includes software configured for executing on a processor of a computing device. For example, the algorithm can build a user-location map through which the systems and processes can keep track of relevant users at a given time. The user-location map may show a rough order of magnitude of the location of the users in order to reduce the frequency of users locations updated and thus reduce battery usage within portable computing devices of users. Thus, by knowing roughly where a user is by only asking where the exact location is when relevant (relevant, for example, may mean when there is a question in a pre-defined perimeter described as 'near the user,' when the user enters an area of current high or historical activity), the battery life can be preserved versus following a user device continuously. The locations may be determined and stored in any number of formats using any number of location information, such as latitude, longitude, altitude, motion status, location source identifiers, accuracy information, data-link quality, update information, geo-tagging information and the like. Updates may be recurring at regular or irregular intervals, determined in response to a user "checking in" to tell the system where they are, based on location changes, altitude changes, changes in connections (e.g., changes in Wifi connections), connection to a beacon (via bluetooth or other), using another app sharing the location, entrance to areas predefined as areas of high or low interest so as to predefine the frequency of updates or the like. Relevancy may be determined based on various information, such as movement (e.g., average movement where the device is likely with an owner, no movement where the phone is likely not with an owner, fast motion such as where the device and user are in a car or other transport and thus the location might be considered irrelevant for location-based searches, profile, type of service (Eco system) through which you are connected etc.).

The algorithm may also provide a positive definition of a location such that a request is sent to the location intended by a requester. In one implementation, for example, prior historical information confirmed from successful prior searches may be retrieved from one or more databases to provide a positive definition of the location, and correspondingly information from the present search result may be used to update the one or more historical databases. Further, where public databases (e.g., Google maps, Apple, Yahoo, foursquare, yelp, openstreet map) are used, various method of cross-checking information between different databases to confirm (e.g., majority, average, etc.) a greater likelihood of location may also be used. In this manner, false positives where requests are sent to users not at the correct location may be reduced or even eliminated. In another implementation, if there is only a single responder at a location that many other users are interested in and send requests for information to this location, the algorithm may use previous answers provided by the responder and offer them to the requesters (in order not to overload the responder).

In one implementation, for example, an algorithm may receive an inquiry related to a location from a user. In this implementation, the algorithm may attempt to verify the location from the request and/o improve the accuracy of the location from the request. For example, the algorithm may determine how the location was defined for the request. If the location includes a text description of the location, the algorithm may attempt to retrieve the location from a plurality of different databases (e.g., independent databases). Where a particular database has been designed for providing directions to a user in a vehicle, for example, the accuracy may not be sufficient to answer a question about the location. Depending on details of the question about a particular location (e.g., a store inside a mall that may or may not be visible from a nearby road) data available in a particular database may not provide a level of accuracy desired to readily identify the location for selection of a potential responder to answer the question. Thus, the algorithm may use various techniques to improve the accuracy of the location identified in a request and/or verify the location within a reasonable level of accuracy.

In one implementation, for example, the algorithm may determine whether the location identified in a request is found within a database including one or more verified locations. A location may be verified, for example, by prior successful requests (e.g., requests that have been confirmed in some manner, such as by a prior requestor, responder, automatically or in some other manner). In some implementations, for example, the requestor may be given an opportunity to rate and/or give feedback after a request has been answered. In this example, where a response has been indicated to be successful, the location may be stored in a database listing verified locations. If the location identified in the request is a verified location, the algorithm may assign location information from a verified record corresponding to that location for use in a request for information related to the requested location.

If the location is not found in the verified database (or if no verified database is being used), the algorithm may also request location information from one or more other databases (e.g., one or more public location databases). The locations(s) found in the one or more databases may be compared to each other to determine a "best fit" or other accurate fit to determine location information to be used for the location identified in the request. In this implementation, the information for a plurality of different databases may be compared, ranked, analyzed or otherwise used to identify accurate information corresponding to the location identified. Various schemes may be used to identify one or more of the location information found in the various databases, such as majority voting, averaging, identify databases with better likelihood of accuracy (e.g., databases where a business owner has the ability to modify the location information of the business). Once location information is identified for the location in the request, the algorithm may use that location information in the request to identify potential responders and/or to identify the location to the potential responders. Another manner to improve accuracy is to enable users to report "not at the desired location" when receiving a request for information.

In this manner, a location identified in a request may be checked against known data to confirm or increase the likelihood of having good information, such as to improve future matching. Further, once the request is successfully answered the location information may be added into a verified location database such as described above automatically and/or manually so that the verified information is added to over time.

Once the location information is identified, the algorithm in various implementations may further determine a type of area for that location. The type of area may be identified in the request or determined from analyzing the request. For example, the algorithm may determine whether the location is indoors or outdoors. Depending on the type of location, various parameters of the question and/or the location may be adjusted (e.g., dynamically adjusted). A radius of relevance (e.g., a geo fence or other location within which a potential responder may be present) corresponding to a particular location may be dynamically adjusted depending on one or more parameters related to that location. For a request for weather information for a given outdoor location (e.g., Central Park, N.Y.), for example, a relatively large dynamic definition of radius (or other dimension) may be assigned to the location for purposes of the request. For information more specific to a particular location (e.g., availability of seating in a particular location within Central Park), the algorithm may dynamically define a radius or other dimension of relevancy that is relatively smaller than the one used for general weather inquiries related to the location. In various implementations, the dynamic radius of relevance may correspond to a geo fence or other identifier of a location within which a request is eligible to be delivered to a potential respondent located within the geo fence for responding to the request. Any number of factors, such as time, parsing of text, line of sight, Analysis of GIS (Geographical information systems) databases, identification by requestor or other information may be used for dynamically determining an area of relevance for the location identified in the request.

During entry of the request, the application or other executable may identify a topic of the request (e.g., through typing recognition or location identifier) and automatically suggest a question/request about the location or may automatically offer possible locations to ask about. Further, the algorithm may suggest topics and/or locations based on past movement/location patterns and/or previous requests submitted.

Based on the location(s) identified in the request, the algorithm may further identify one or more relevant users at the location(s). The relevant users identified as potential respondent(s) may be one or more users based on accuracy information, knowledge base (e.g., expertise), rankings related to prior successful answers or user feedback, responsiveness, demographics (e.g., age and gender), time of day, areas of interest, preferred locations, amount of traffic within a location, sponsorships (e.g., sponsored responses) or the like. The requests may be addressed to a single potential respondent at a time or sent (e.g., in parallel) to a plurality of potential respondents at the same time. The requests may also be sent to a plurality of potential responders in a row, i.e. one after the other. That can be done with a predefined time delay, or with a dynamic delay, for example as function of population, type of location, as a function of usage such as if the user opened the question he might receive some more time before the next user will be approached.

In one particular implementation, for example, an algorithm may determine how many potential responders are present within an area (e.g., a geo fence) corresponding to the location identified in a request. If a single user is the only one present, the algorithm can forward the request to that user for a potential response. If there are more than one users present, the algorithm may use any number of techniques to identify one or more users to which the request is forwarded for a potential response. Any number of potential respondents may be identified. In one example, a single user is identified based on one or more determinations of how to select the best or an appropriate user. In this example, the user may psychologically feel a stronger urge to answer the request if the user knows he or she is the only person receiving the request. A down selection process, for example, may be used to selectively identify the user to receive the request. Where a plurality of potential users are available, profiling, past performance, type of device or other identification of one or more potential responders may be performed. The profiling or other criteria may be manually entered and/or dynamically determined over time, such as through machine learning, to increase the probability that a potential responder will make an effort to respond and/or provide a useful answer. Using prior successful feedback, the profiling or other information may be determined based on prior successful or unsuccessful requests.

In another example, the algorithm may forward the request to any user within the location meeting any particular criteria determined to qualify the user for responding to the request.

A location of users that are potential responders may be determined in any number of ways including checking in at a location, pinging, polling, pushing or otherwise communicating with an electronic device of the user to determine the location.

In one particular implementation, an ad hoc user base is provided in which users of a system are identified by location so that they may be matched to one or more requests including a location. The ad hoc user base, for example, may be used to find one or more users eligible to answer a request corresponding to a particular location even if from various different services. Once a user enters an area of relevance (e.g., static or dynamic), the user may be identified as eligible to receive a request for a potential response. If multiple users are present, individual users may be selected as described above.

The ad hoc user base may include users from services unrelated to a particular requester. For example, if the system includes a plurality of independent platforms on which the process is implemented, users of those independent platforms may be stored in a common ad hoc user base and may be available to answer requests regardless of relationships between the users or the platforms corresponding to those users. Thus, the common ad hoc user base allows a user base to be built quickly as the system and processes are embedded into or otherwise used in association with different platforms. The common user database, for example, may join users from different databases A, B, C . . . N to make the users available to users in any of the databases in real-time, near-real-time and/or relevant time focused on location of the potential responder users. Users of the systems and processes thus can receive answers from any user in the ad hoc database without being otherwise tied to that user.

Further, if the request is not time-sensitive and no appropriate users are present in the corresponding area, the algorithm may wait for a potential responder to enter the area/geo fence.

Once the request is forwarded to one or more potential responders, the algorithm can further manage the process until a response matching the request is found. The algorithm, for example, can determine whether the response is a complete response to the request, determine the number and order of potential respondents to receive the request, the manner of contacting the respondents, sending reminders and/or follow ups to potential respondents or the like.

The algorithm may further enhance the probability that a given potential respondent will actually respond. For example, the algorithm may determine that a particular user is expected to be at a given location (e.g., based on past behavior), analyze location, type of request (e.g., special of the day (indoor) or weather (outdoor)), textual analysis, line of sight analysis, etc. A radius or other location attribute may be dynamically altered based on attributes of the request (e.g., type of question, textual analysis, timing, etc.). This activity may also be done manually by the service providers or by the location-based service.

If a potential respondent does not respond (e.g., within a predetermined time period) or declines the request, the algorithm may forward the request to one or more additional potential respondents.

The algorithm, may allow for indoor and/or outdoor navigation. Further a potential respondent may be determined based on whether a request is related to an indoor or outdoor location. The algorithm may generate multiple parallel questions to the same one or more potential responders. The parallel questions may be related to one or more individual requests.

The algorithm may further provide a split distributed algorithm that works on a back and front end in parallel. Filters (e.g., based on altitude, speed, past performance, profile, location, $3^{rd}$ party service of user and the like) may also be used.

One or more databases may also be created and/or updated with results from location-based search queries and responses. The database may be used for data mining or other uses with respect to one or more locations of interest. For example, historical questions and/or responses (e.g., requests and/or responses related to one or more locations) may be retrieved from the database(s). Further, aggregation of recent updates about a location may be provided. The databases(s) may provide an aggregated source for historical questions and answers (requests and responses), in multiple data formats (e.g., text, imagery, voice, video and the like) and may further aggregate anonymous profiles, timing and location from where and to where questions were asked, and, as such, offer a source of unique information.

Systems and methods may further include specialized personal computing devices including enhanced location-based functionality, such as through the use of one or more improved location sensor (like a beacon or so) configured to enhance location accuracy. Indoor location(s) may, for example, be provided for indoor navigation, widespread unique database information (e.g., within one or more retailers allowing for targeted advertising such as where particular goods are offered for sale within the one or more retailers).

The database(s) collected, enhanced or otherwise improved through use of the systems and methods for providing location-based search services provide a crossroad of information, time information, location information, and ad-hoc connection between users and service providers. This information may, for example, be collected when a user actually takes the initiative to express interest in the information and is eager to receive relevant information and value added propositions. In this view, the information may be monetized in a number of manners. For example monetization methods such as pay-per-click (PPC), revenue sharing, location-based advertising and the like may be leveraged using this information including knowledge of time, location, profile and/or actual interest.

Other monetization applications include providing a direct and straight forward communication channel for retailers (e.g., a brick and mortar store) or other business owners (like tour guides etc.) with one or more potential customers directly expressing an interest in a specific location. In one implementation, for example, the systems and methods provide the capability for one or more retailers to respond in real-time, near-real-time and/or relevant time to a query from a user through a dedicated or other communication channel. The retailer may provide a sponsored response to a query and/or provide a time-limited coupon in response to a query although other responses are also contemplated. In a sponsored response implementation, for example, the retailer may, in addition to an "un-biased" crowd response, respond to a query and potentially engage a requestor (potential customer) directly by providing relevant information before the requestor makes a decision to act. In this function, the provision of real-time, near-real-time and/or relevant time information rather than typical historical information that may not provide the information needed to adequately respond to the requestor with accurate information reflecting the actual situation at the locations(s) of interest. Further, time-limited coupons or other offers (e.g., personalized value propositions) may also be provided to the requestor incentivizing the requestor to visit the retailer instead of typical predefined and impersonal coupon models.

Since the communication with the sponsored response retailer is direct, the retailer may customize individual offers or coupons (e.g., self-written, chosen from a list of acceptable offers/coupons, connected to a sponsored response, as an ad hoc credit to the company from which the user comes from and the like).

In some implementations, the communication with the business does not require early contact exchange of information with it—the question is generated on the business location. Thus, if the owner or the business itself closes or changes hands, the question will be matched with the next business at that place. For example: Asking about a food truck location where the trucks change daily—Who's there today? What do they sell? The service may enable questions to be routed to a specific owner or employee of the store and do a follow-me of the question if no one is there now but that's in addition to our core capability and only if the owner of the business (or a third party like a directory service) claims the business and provides the follow-me contact information.

Further, a requester may send multiple parallel requests to a plurality of individual retailers in parallel within a given location without needing contact information, such as a phone number or email address. In this manner, the requester may give a plurality of individual retailers the opportunity to compete for his or her business.

A retailer when answering will not be usually anonymous unlike a consumer.

A retailer/business may also refer a request to another retailer for a sponsored response. For example, a business may refer the requester to a third party business in the area or having a similar profile who can also provide a response if the referring business doesn't have the capacity to serve the requester (e.g., is busy or not open).

Also a request might be referred automatically by the algorithm to another retailer for an additional or alternative sponsored response. For example, the algorithm may refer the requester to a third party business in the area or having a similar profile who can also provide a response if the referring business doesn't have the capacity to serve the requester or to offer alternatives to the requester. (e.g., is busy or not open).

The business might or might not know that other businesses received a similar question.

The business may also forward potential requests to their personal computing devices regardless of their actual location. For example, an owner of a business may respond to requests while away from the business at the time of the request.

The systems and methods also provide the ability of a mobile service provider to offer a location-based chat or other communication service, leveraging on an existing mobile crowd to improve service, enhance engagement and increase an average revenue per user (ARPU).

An enhanced database, such as described above, may further provide valuable information/data that may be offered to retailers. A location-based histogram may, for example, may enable a retailer to better target marketing or expansion efforts (e.g., where did people ask from, what about, at what time(s), what is their profile and the like). Such a database may or may not be correlated with a GIS database of own ownership or third parties. See e.g., FIG. 3 discussed above.

In one implementation, a sponsored response may be used by a business to respond to an individual in a one-on-one or many-to-one basis. Thus, a user may send a question and receive multiple responses in parallel or in a near-parallel manner. Thus, the business may offer custom offers (e.g., time-sensitive coupons) tailored to the individual user (e.g., in response to the request from the user). Further, this allows for the system and process to directly monetize the sponsored responses independent of other parties, such as search engines or the like.

In various implementations, users (requestors or responders) may have the ability to provide requests to multiple locations in parallel, define the type of information requested (e.g., image, video, live video, text, voice or the like). The locations can be sourced from a directory (e.g., hotels in Denver), defined by a user for a single use or saved for future use. In response, multiple answers can be received from multiple locations. Further, follow up requests or messages can be prepared, such as requests for more information or sponsored responses including promotions or ads.

The system and processes may further provide for automatic translation (e.g., based on users, location, subject matter or the like). A user may send invitations to acquaintances, broadcast multiple user questions, generate a collage or group of different answers specific to time, location, broadcast mode, etc. Responses/answers may be personalized (e.g., editing and signature modes). Live video feeds pointing direction of the camera offered to requestors may be controlled from afar (e.g., via arrows or other controls) to a requester seeking to access the feed. Individual location(s) may be pre-loaded into favorites based on activity in third party platforms, such as social media platforms (e.g., twitter, Facebook, etc.). Optional anonymity may allow for users sharing common interests to step outside of anonymity and connect via the application and/or a third party application, such as social media. Further, dynamic pointing functions allow a user or the algorithm to point a user to a suggested question.

Example applications of systems and processes described herein include the sports, news/weather applications shown in Appendices 4 and 5 of U.S. provisional application No. 62/006,040, filed 30 May 2014 which is incorporated by reference in its entirety within this application, as well as telecommunication companies providing location-based chat services, city and government providing crowd sourced information from particular locations, micro-weather, polling.

Post-event reports and analytics can be based on aggregation or other analysis of location-based requests and responses, and the reports and analytics can be sold such as for advertising targeting.

FIG. 10 shows an example process of a user matching process 360 of a location-based service for receiving a request related to one or more particular locations and matching that request to one or more potential responder(s). In the particular implementation shown in FIG. 11, for example, a rough order of magnitude of user locations is performed in operation 362. A question or other request about a particular location is received in operation 364. If determinable, the service improves the location accuracy of the question in operation 366. A location request is sent to users previously determined to be in an area near the particular location of interest in operation 368. Based on a response to the location requests, potentially relevant users are identified in operation 370. If there is more than one user at the location, the service builds a list of priorities in operation 372, and the request is forwarded to the first user on the list in operation 374. If the user does not answer the request (e.g., within a predetermined time period), the request is forwarded to the next user on the list in operation 376. In other cases, it can be defined that the question may be sent to the first 2, 3, . . . , n users in the list.

Figure 10A:
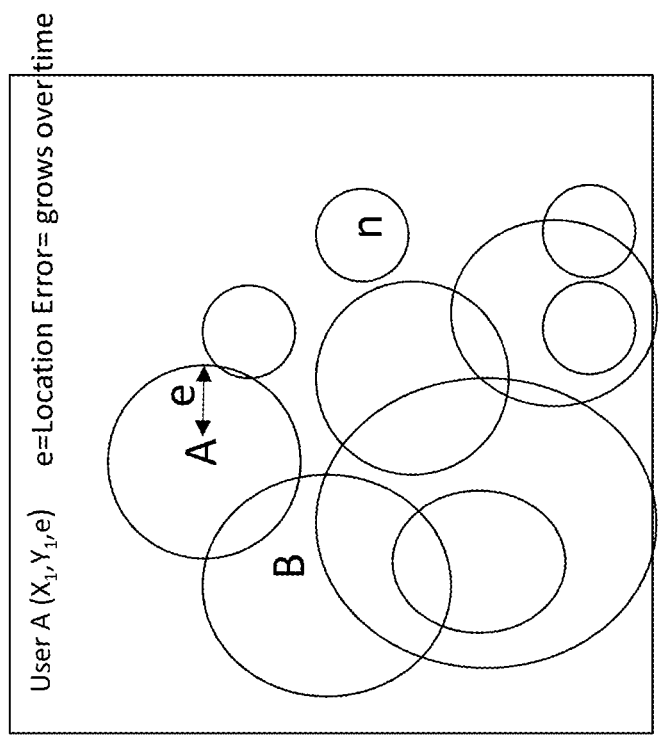
FIGS. 10A-10D, collectively, show example operations of an example process of matching a location-based request generated on a requesting computing device to one or more potential responding computing devices based on the location associated with the request.

FIGS. 10A-10D, collectively, show example operations of an example process of matching a location-based request generated on a requesting computing device to one or more potential responding computing devices based on the location associated with the request. In this particular implementation, FIG. 10A shows a determination of a rough order of magnitude of the user locations based on a determination of locations over time. As time passes since the last location received from a computing device associated with a user, an error "e" associated with the location will increase until a new location is received from the computing device associated with that user. Similar errors associated with computing devices associated with users B, . . . , N are also shown. As described above, the locations provided by the computing devices associated with users may be updated by the device itself (e.g., based on activities related to the device such as every X minutes, connecting to WIFI, entering a geo-fence, roaming, etc.) or related to an external trigger (e.g., a request to update the location of the device from a server or other system component).

Figure 10B:
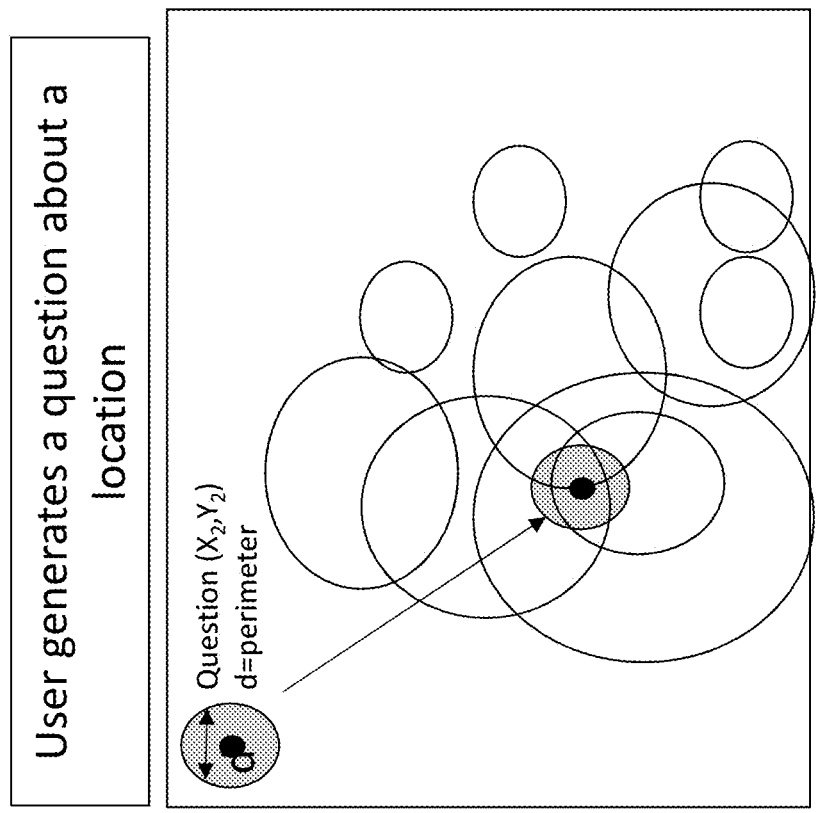

FIG. 10B further shows when a user generates a request (e.g., question) related to a particular location. In this example, a location relevant to the question may be defined by the user and/or the system as the location $(X_2, Y_2)$ and a perimeter equal to a distance, d. Locations may be defined in many other manners, however.

Figure 10C:
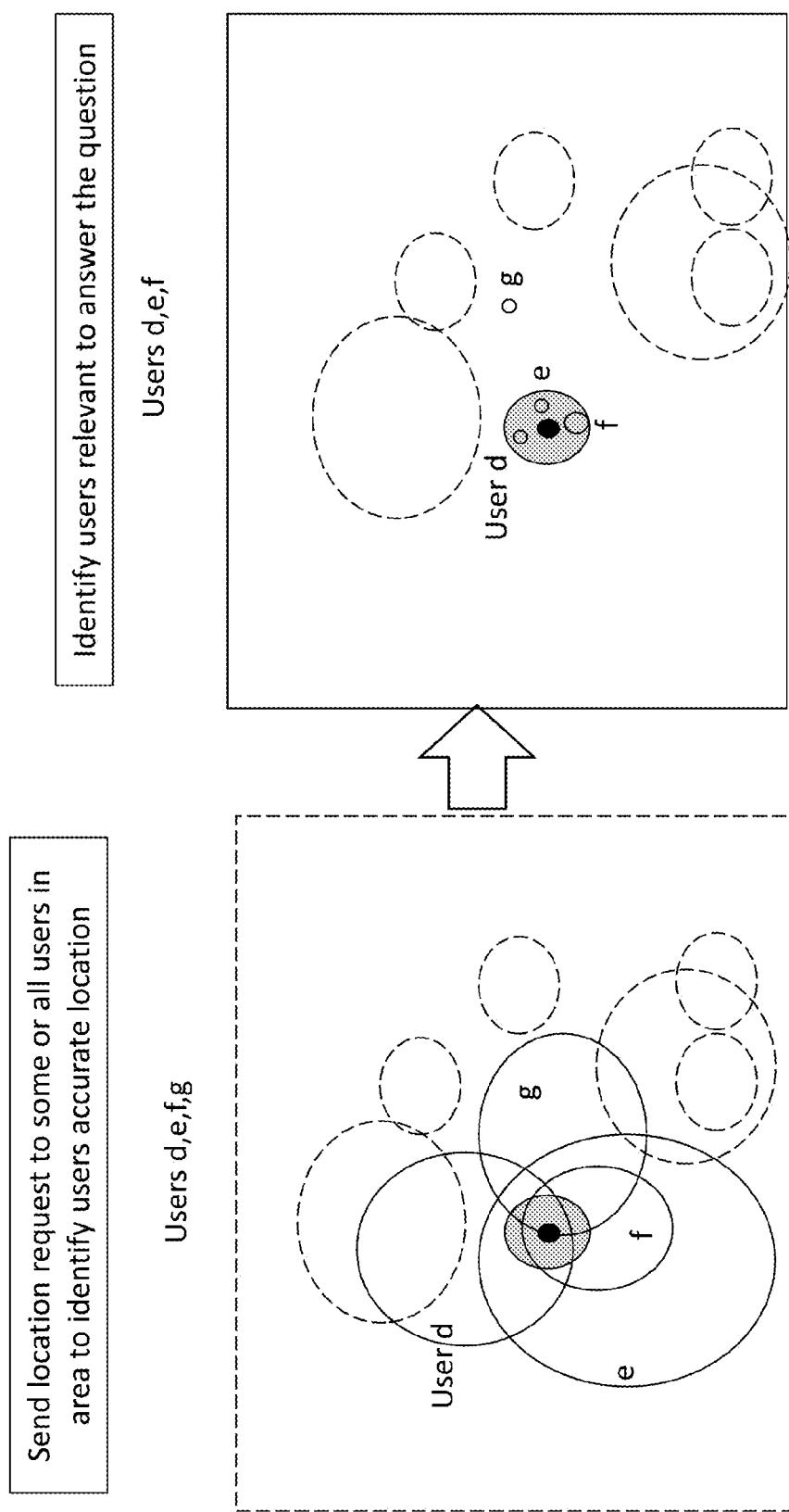

FIG. 10C shows that, based on the Rough Order of Magnitude of user locations stored for a user base, computing devices associated with users E, F, and G are identified in this example as overlapping with the location $(X_2, Y_2)$ and a perimeter equal to a distance, d, defined in the request for information by the requesting user. Thus, a preliminary identification of users E, F and G may be made based on a map of Rough Order of Magnitude of user computing device locations shown in FIGS. 10A and 10C. From this subset of users, the location-based service system requests location updates from users D, E, F and G. An example result of this request is also shown in FIG. 10C. In this example, the users D, E and F are determined to be in the relevant location $((X_2, Y_2)$ and a perimeter equal to a distance, d.).

Figure 10D:
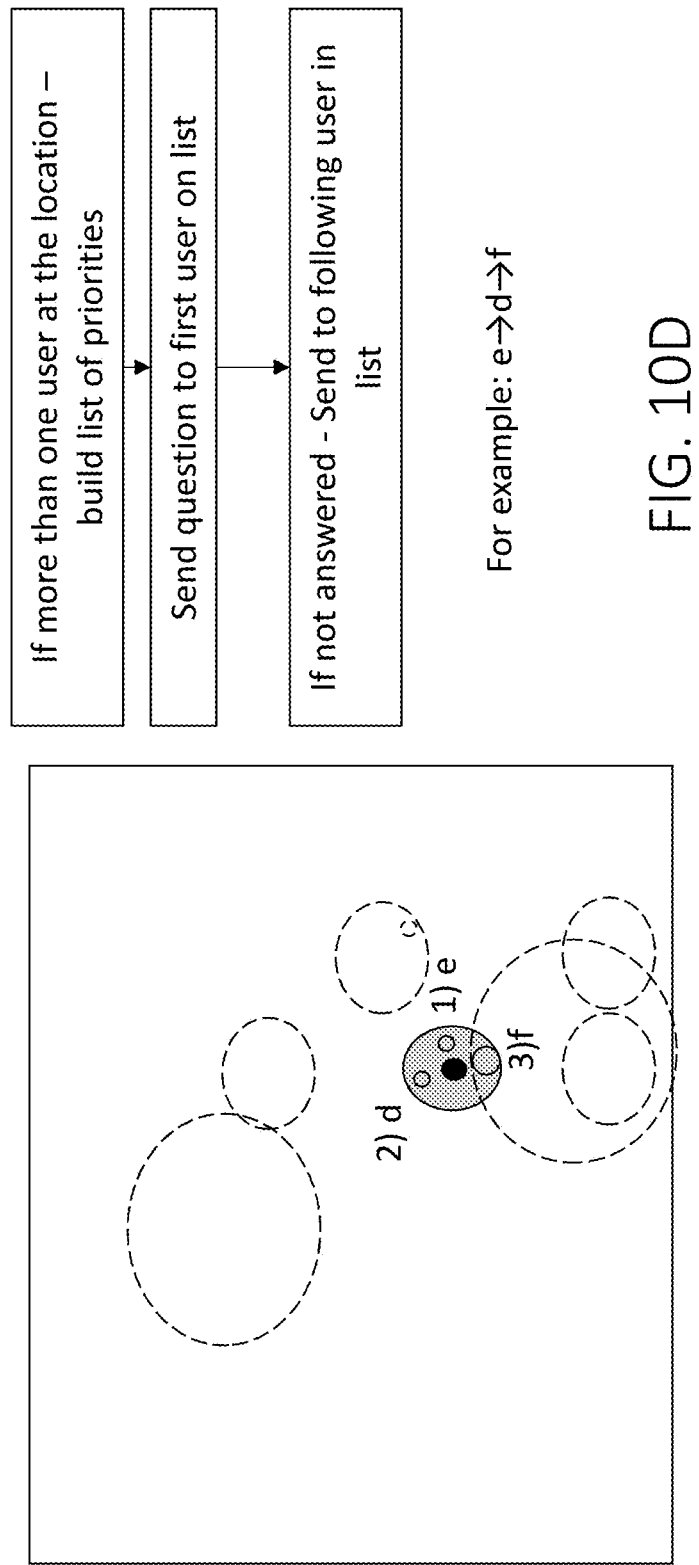

FIG. 10D shows an example process of determining which computing device(s) of the relevant users are to receive the request for information about the location $((X_2, Y_2)$ and a perimeter equal to a distance, d.). In this particular example, a list of priorities may be built between the users D, E and F. The priorities may be determined in any number of manners, such as consistency in responding, ratings of responses, etc.

The request/question is transmitted to a user computing device based on the list of priorities. For example, the request/question may be transmitted to a single computing device associated with a user at a time, starting with the highest priority user. Alternatively, the request may be forwarded to groups of user computing devices at the same time based upon the determined priority. If the highest priority users/computing devices do not respond (e.g., within a predetermined time period or a time period defined in the request/question), the request may be forwarded on to subsequent user(s)/computing device(s) based upon the priorities. In the example shown in FIG. 10D, the priority list is E, then D, then F.

FIG. 11 shows an example location based survey process in which a question or request is generated and sent in parallel to a plurality of users in a plurality of locations. In the particular implementation shown in FIG. 11, a user in need of information can use his or her computing device to generate a request, such as a question. The request may also include one or more parameters for that request. For example, the user via the computing device may define a location of interest for the request, define the content of the request (e.g., a question), define a time of relevancy for the request, define a future time of becoming live, define if the request/question is recurring and, if so, a frequency of reoccurrence, define a type of media requested for a response to the request and other parameters relevant to a particular request.

The request is then sent to one or more locations (locations 1, 2, 3, 4, N−1, N in the example shown in FIG. 11). A user base matching system then identifies user(s), if any, associated with the one or more locations and forwards the request to one or more of the identified users. The system also receives responses/answers and returns the responses/answers to the originating computing device of the requesting user.

Other concepts include a process to provide a 'Non anonymous' response in parallel to one or more 'Anonymous responses.' A process to choose one out of a list of several employees in a business, for example, enabling to send the question based on: location (who's in the business), hierarchy defined by the owner, past performance, expertise (Food sales person for example if the question is about food) etc. A process to perform a Follow-me function—The ability of a store owner (or worker) to get the question even if he's not at that location right now (for example: A question asked late at night when the business is closed). A process to identify who's in the business based on location extrapolated from Wifi—The location can be defined also by Wifi—You're connected to the store's Wifi or you 'see' the store's wifi. A process to identify location based on a laptop/Desktop activity. A process to cross reference between various platforms of the store owner (or employee) to know his location and activity level and optimize the matching—Phone, Tablet, wearable, laptop, desktop etc. The answer from a business can include: Information, Coupon, Other offer, Personal 1on1 information—'I'll keep a parking spot for you,' Publicly available info—'That's our special of the day menu.'

Also, a process to monitor Conversion/walk-in into the store/Conversion—Providing conversion information by comparing the location of the person when asking about the business and identifying by location that he walked in to the store later on after receiving an answer. In this example, there is no need for any action on the user's side (like Check in etc). Conversion information can be relevant for: The store owner, For the system, For third parties—Selling ads etc . . . , For competing stores, etc. Such information can be provided to the store owner as a temporal report. Such information can also be used to automatically claim or redeem the 'coupon' as you walked in.

Exemplary Computing System

Figure 12:
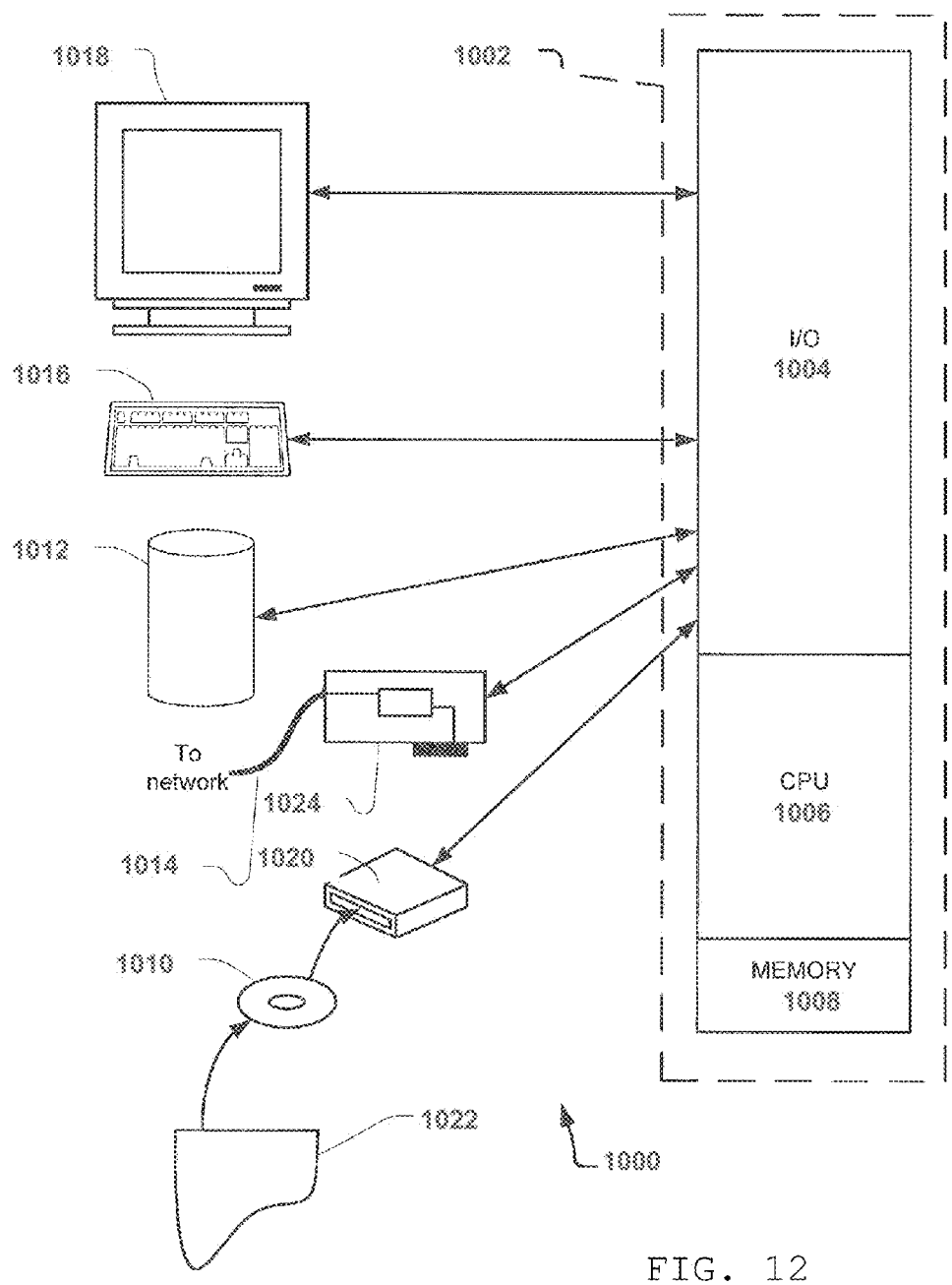
FIG. 12 a schematic diagram of a computing device upon which a location based information retrieval system may be implemented, according to one or more implementations shown and described herein.

FIG. 12 is a schematic diagram of a computing device 1000 upon which a location based information retrieval system may be implemented. As discussed herein, implementations include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

FIG. 12 illustrates an exemplary system useful in implementations of the described technology. A general purpose computer system 1000 is capable of executing a computer program product to execute a computer process. Data and program files may be input to the computer system 1000, which reads the files and executes the programs therein. Some of the elements of a general purpose computer system 1000 are shown in FIG. 1 wherein a processor 1002 is shown having an input/output (I/O) section 1004, a Central Processing Unit (CPU) 1006, and a memory section 1008. There may be one or more processors 1002, such that the processor 1002 of the computer system 1000 comprises a single central-processing unit 1006, or a plurality of processing units, commonly referred to as a parallel processing environment. The computer system 1000 may be a conventional computer, a distributed computer, or any other type of computer. The described technology is optionally implemented in software devices loaded in memory 1008, stored on a configured DVD/CD-ROM 1010 or storage unit 1012, and/or communicated via a wired or wireless network link 1014 on a carrier signal, thereby transforming the computer system 1000 in FIG. 12 into a special purpose machine for implementing the described operations.

The I/O section 1004 is connected to one or more user-interface devices (e.g., a keyboard 1016 and a display unit 1018), a disk storage unit 1012, and a disk drive unit 1020. Generally, in contemporary systems, the disk drive unit 1020 is a DVD/CD-ROM drive unit capable of reading the DVD/CD-ROM medium 1010, which typically contains programs and data 1022. Computer program products containing mechanisms to effectuate the systems and methods in accordance with the described technology may reside in the memory section 1008, on a disk storage unit 1012, or on the DVD/CD-ROM medium 1010 of such a system 1000. Alternatively, a disk drive unit 1020 may be replaced or supplemented by a floppy drive unit, a tape drive unit, or other storage medium drive unit. The network adapter 1024 is capable of connecting the computer system to a network via the network link 1014, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 1000 is connected (by wired connection or wirelessly) to a local network through the network interface or adapter 1024, which is one type of communications device. When used in a WAN-networking environment, the computer system 1000 typically includes a modem, a network adapter, or any other type of communications device for establishing communications over the wide area network. In a networked environment, program modules depicted relative to the computer system 1000 or portions thereof, may be stored in a remote memory storage device. It is appreciated that the network connections shown are exemplary and other means of and communications devices for establishing a communications link between the computers may be used.

In accordance with an implementation, software instructions and data directed toward operating the subsystems may reside on the disk storage unit 1012, disk drive unit 1020 or other storage medium units coupled to the computer system. Said software instructions may also be executed by CPU 1006.

The implementations described herein are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of a particular computer system. Accordingly, the logical operations making up the embodiments and/or implementations described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products. One implementation of a computer program product provides a transitory or non-transitory computer program storage medium readable by a computer system and encoding a computer program.

Furthermore, certain operations in the methods described above must naturally precede others for the described method to function as described. However, the described methods are not limited to the order of operations described if such order sequence does not alter the functionality of the method. That is, it is recognized that some operations may be performed before or after other operations without departing from the scope and spirit of the claims.

Although implementations of this invention have been described above with a certain degree of particularity, those skilled in the art could make numerous alterations to the disclosed implementations without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A process for providing location-based information capabilities comprising:
   maintaining a rough order of magnitude of locations for a plurality of associated user devices over time;
   receiving a location-based request generated on first computing device;
   analyzing the request using a processor, wherein the operation of analyzing includes identifying a location associated with the request- and determining at least one potential responding computing device associated with the location; and
   transmitting the request to the at least one potential responding computing device for generation of a response to the location-based request,
   wherein the operation of analyzing comprises, when the rough order of magnitude is within a predefined distance from the location, requesting an updated location from the at least one potential responding device.

2. The process of claim 1 wherein operation of determining whether at least one potential responding computing device is associated with the location comprises at least one of the group comprising: determining whether the potential responding computing device is at the location, determining whether the potential responding computing device is within a predetermined distance or area from the location; comparing a rough order of magnitude of the at least one potential responding computing device to the location; comparing a rough order of magnitude of the at least one potential responding computing device to the location and, when the rough order of magnitude is within a predefined distance from the location, requesting an updated location from the at least one potential responding device; comparing a rough order of magnitude of the at least one potential responding computing device to the location and, when the rough order of magnitude is within a predefined distance from the location, requesting an updated location from the at least one potential responding device and determining whether the updated location is within a predefined distance from the location; comparing a rough order of magnitude of the at least one potential responding computing device to the location and, when the rough order of magnitude is within a predefined distance from the location, requesting an updated location from the at least one potential responding device and determining whether the updated location is associated with the location; identifying a computing device at the location or within a pre-defined perimeter of the location; identifying a computing device that was recently at the location or within a pre-defined perimeter of the location; and identifying a computing device that will be at the location or within a pre-defined perimeter of the location within a pre-determined period of time.

3. The process of claim 1 wherein the at least one potential responding device comprises a mobile computing device.

4. The process of claim 1 wherein the at least one potential responding device comprises a sponsored computing device associated with the location, at the location or located within a predetermined distance from the location.

5. The process of claim 1 wherein, when the potential responding device fails to respond within a predetermined time period, transmitting the request to at least one other potential responding computing device for generation of a response to the location-based request.

6. The process of claim 1 wherein the operation of maintaining a rough order of magnitude of locations for a plurality of associated user devices comprises repetitively requesting a location of each of the plurality of associated user devices based upon one or more activity of each of the plurality of associated user devices.

7. The process of claim 6 wherein a plurality of locations received over time for each of the plurality of associated user devices is stored in at least one of the group comprising: a map, a file, a database, an array, a cache, and a data structure.

8. The process of claim 6, wherein the operation of determining whether the at least one potential responding device is associated with the location further comprises, when the rough order of magnitude is within a predefined distance from the location, requesting an updated location from the at least one potential responding device.

9. The process of claim 8 wherein the operation of determining whether the at least one potential responding device is associated with the location comprises determining whether the updated location is at the location or located within a geo fence corresponding to the location.

10. The process of claim 1 wherein the location is determined based upon an analysis of a plurality of location databases.

11. The process of claim 10 wherein the analysis of the plurality of location databases comprises a comparative analysis of the plurality of location databases.

12. The process of claim 1 wherein the at least one potential responding computing device is selected based on a location of the computing device and the location of the computing device is within an area of relevance corresponding to the location.

13. The process of claim 12 wherein the area of relevance is at least one of the group comprising: a dynamic area of relevance and a dynamic area of relevance determined based on the request.

14. The process of claim 1 wherein the potential responding computing device is selected from at least one of the group comprising: a common ad hoc user base and within a geo fence corresponding to the location.

15. The process of claim 1 wherein the location is verified based on at least one of the group comprising: at least one prior completed response, a rough order of magnitude prior to a user being determined relevant for responding to a request, and in response to a user being determined relevant for responding to a request.

16. The process of claim 1 wherein the potential responding computing device is identified based on a sponsorship request related to the request and/or the location.

17. A process of matching a user request comprising:

performing a rough order of magnitude of locations associated with user mobile computing devices and storing the rough order of magnitude of locations over time;

receiving a request about a location;

identifying a first plurality of potential responding mobile computing devices associated with the location by comparing the location to the stored rough order of magnitude of locations;

sending a location request to each of the first plurality of potential responding mobile computing devices having a stored rough order of magnitude location associated with the location to identify accurate locations of each of the first plurality of potential responding mobile computing devices;

identifying at least one second mobile computing device associated with the location based upon responses from to the location request.

18. The process of claim 17 wherein the process comprises determining if there is a plurality of second mobile computing device associated with the location.

19. The process of claim 18 wherein, when there is more than one second mobile computing device associated with the location, determining a list of priorities for the plurality of second mobile computing devices.

20. The process of claim 19 wherein the process comprises transmitting the request to at least one of the plurality of second mobile computing devices based upon the list of priorities.

21. The process of claim 19 wherein, when the at least one of the plurality of second mobile computing devices fails to respond to the request, transmitting the request to at least one additional mobile computing device of the plurality of second mobile computing devices based upon the list of priorities.

22. The process of claim 1 wherein the operation of maintaining a rough order of magnitude of locations for a plurality of associated user devices comprises repetitively internally generating and transmitting a location by each of the plurality of associated user devices based upon one or more activity of each of the plurality of associated user devices.

* * * * *